3,265,698
NOVEL SUBSTITUTED 3-(α-CARBAMOYLOXY-LOWER ALKYL)-4,7-INDOLOQUINONES

George Rodger Allen, Jr., Old Tappan, N.J., and John Frank Poletto, Nanuet, N.Y., assignors to American Cyanamid Company, Stamford, Conn., a corporation of Maine
No Drawing. Filed Aug. 7, 1964, Ser. No. 388,312
20 Claims. (Cl. 260—268)

This is a continuation-in-part of application Serial No. 315,710, filed October 11, 1963, now abandonded.

This invention relates to new organic compounds and, more particularly, is concerned with novel substituted 3-(α-carbamoyloxy-lower alkyl) - 4,7 - indoloquinones and with novel methods of preparing these compounds. The novel substituted 3-(α-carbamoyloxy-lower alkyl)-4,7-indoloquinones of the present invention may be represented by the following general formula:

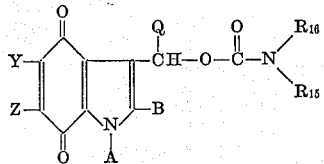

wherein A is hydrogen, lower alkyl, ω-(halo)lower alkyl, ω-(lower alkylthio)lower alkyl, ω-(di-lower alkylsulfonium)-lower alkyl halide, ω-(hydroxy)lower alkyl, ω-(tetrahydro-pyranyloxy)lower alkyl, ω-(azido)lower alkyl, or ω-(mercapto)lower alkyl; B is hydrogen, lower alkyl, halomethyl, aminomethyl, hydroxymethyl, lower alkoxymethyl, lower alkanoyloxymethyl, tetrahydropyranyloxymethyl, N-mono-(lower alkyl)carbamoyloxymethyl, lower alkanoylthiomethyl, lower alkoxycarbonyl, carboxamido, cyano, formyl, hydroxyiminomethyl, lower alkoxyiminomethyl, N⁴-lower alkylsemi-carbazanomethyl or semicarbazanomethyl; Q is hydrogen or lower alkyl; Y is hydrogen, hydroxy, lower alkoxy, halogen, lower alkyl, lower alkylthio, amino, mono(lower alkyl)-amino, di(lower alkyl)amino, ω-(hydroxy)lower alkylamino, ω-(di-lower alkylamino)mono(lower alkyl)amino, ω-(tri-lower alkylammonium)mono(lower alkyl)amino halide, lower cycloalkylamino, phenyl lower alkylamino or polymethyleneimino of from two to five carbon atoms; Z is hydrogen, lower alkyl, bromine, lower alkoxy, amino or methylamino; $R_{15}$ is hydrogen, lower alkyl or phenyl and $R_{16}$ is hydrogen, lower alkyl, lower alkenyl, phenyl lower alkyl, phenyl, halo-substituted phenyl, lower alkoxy-substituted phenyl, naphthyl, ω-di(lower alkyl) aminoalkyl, lower cycloalkyl, ω-(cyano)lower alkyl, ω-(lower alkylthio)lower alkyl, ω-(lower alkoxy)lower alkyl, β-(hydroxy)lower alkyl, γ-(hydroxy)lower alkyl or amino. Suitable lower alkyl, lower alkanoyl and lower alkoxy groups contemplated by the present invention are those having up to about 6 carbon atoms. Suitable ω-substituted lower alkyl groups are those having from 2 to 4 carbon atoms. Suitable lower alkenyl groups contemplated by the present invention are, for example, allyl, methallyl and 2-butenyl. Phenyl lower alkyl may be examplified by benzyl, phenethyl, etc. Suitable halo-substituted phenyl groups contemplated by the present invention may be, for example, m-chloro, p-fluoro and o-bromo. Naphthyl may be α-naphthyl or β-naphthyl, ω-di(lower alkyl) aminoalkyl is exemplified by β-dimethylamino-ethyl and γ-dimethylaminopropyl, while ω-(hydroxy)lower alkyl is exemplified by β-hydroxyethyl and γ-hydroxypropyl. Lower cycloalkyl may be cyclopropyl, cyclopentyl or cyclohexyl while halogen is exemplified by chlorine, bromine and iodine.

When $R_{15}$ and $R_{16}$ are taken together with nitrogen

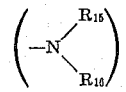

suitable basic groups are N-lower alkylpiperazino, N-(ω-hydroxy lower alkyl)piperazino, N-[(ω-di-lower alkylamino)lower alkyl]piperazino, morpholino, cyclopolymethyleneimino of from 2 to 5 carbon atoms and bislower carboalkoxymethyl.

The novel compounds of the present invention are obtainable as crystalline materials having characteristic melting points and absorption spectra. They are appreciably soluble in many organic solvents such as lower alkanols, acetone, ethyl acetate, and the like. They are, however, generally insoluble in water. The novel compounds of the present invention are useful as antibacterial agents. These compounds have been found to possess broad spectrum anti-bacterial activity in vitro. The minimal inhibitory concentrations, expressed in gammas per milliliter, of some typical compounds of the present invention against various microorganisms when measured by a standard turbidimetric precedure are set forth in the following table:

TABLE I

| Compound | Staph. aureus ATCC 13709 | Staph. aureus ATCC 14154 | Staph. aureus 69 | Strept. sp., β-hemolytic 80 | Pasteurella mutocida ATCC 8369 | Strept. pyogenes C-203 | Klebsiella pneumoniae 53 |
|---|---|---|---|---|---|---|---|
| 1-ethyl-3-hydroxymethyl-5-methoxy-2,6-dimethyl-4,7-dioxoindole carbamate | 1.6 | 1.6 | 1.6 | 6.25 | 1.6 | 0.8 | 50 |
| 1-ethyl-3-hydroxymethyl-5-methoxy-6-methyl-4,7-dioxoindole carbamate | 0.8 | 1.6 | 0.8 | 3.12 | 0.8 | 0.8 | 12.5 |
| 1-ethyl-3-hydroxymethyl-5-methoxy-2,6-dimethyl-4,7-dioxoindole methylcarbamate | 3.12 | 3.12 | 3.12 | 12.5 | 3.12 | | |
| 1-ethyl-3-hydroxymethyl-5-methoxy-2,6-dimethyl-4,7-dioxoindole amylcarbamate | 25 | 25 | 50 | | | | |
| 1-ethyl-3-hydroxymethyl-5-methoxy-2,6-dimethyl-4,7-dioxoindole phenylcarbamate | 6.25 | 25 | 12.5 | 12.5 | 25 | 0.4 | |
| 1-ethyl-3-hydroxymethyl-5-methoxy-2,6-dimethyl-4,7-dioxoindole dimethylcarbamate | 3.12 | 6.25 | 6.25 | 12.5 | 6.25 | | |
| 1-(2-fluoroethyl)-3-hydroxymethyl-5-methoxy-2,6-dimethyl-4,7-dioxoindole methylcarbamate | 3.12 | 3.12 | 3.12 | 12.5 | 3.12 | 1.6 | 50 |
| 1-(2-azidoethyl)-3-hydroxymethyl-5-methoxy-2,6-dimethyl-4,7-dioxoindole methylcarbamate | 3.12 | 6.25 | 6.25 | 12.5 | 6.25 | | 50 |
| 1-(2-methylthioethyl)-3-hydroxymethyl-5-methoxy-2,6-dimethyl-4,7-dioxoindole methylcarbamate | 3.12 | 3.12 | 3.12 | 12.5 | 3.12 | | |
| 1-(2-hydroxyethyl)-3-hydroxymethyl-5-methoxy-2,6-dimethyl-4,7-dioxoindole methylcarbamate | 1.6 | 1.6 | 1.6 | 6.25 | 1.6 | 0.8 | 25 |

TABLE I—Continued

| Compound | Staph. aureus ATCC 13709 | Staph. aureus ATCC 14154 | Staph. aureus 69 | Strept. sp., β-hemolytic 80 | Pasteurella mutocida ATCC 8369 | Strept. pyogenes C-203 | Klebsiella pneumoniae 53 |
|---|---|---|---|---|---|---|---|
| 1-(2-tetrahydropyranyloxyethyl)-3-hydroxymethyl-5-methoxy-2,6-dimethyl-4,7-dioxoindole methylcarbamate | 12.5 | 12.5 | 12.5 | | 50 | 3.2 | |
| 1-(2-chloroethyl)-3-hydroxymethyl-5-methoxy-2,6-dimethyl-4,7-dioxoindole methylcarbamate | 6.25 | 12.5 | 6.25 | 25 | 6.25 | 1.6 | |
| 1-ethyl-2,3-bis-hydroxymethyl-5-methoxy-6-methyl-4,7-dioxoindole 3-methylcarbamate | 0.8 | 1.6 | 1.6 | 6.25 | 1.6 | 1.6 | 12.5 |
| 1-ethyl-2,3-bis-hydroxymethyl-5-methoxy-6-methyl-4,7-dioxoindole 2,3-bis-methylcarbamate | 0.8 | 3.12 | 1.6 | 12.5 | 0.8 | 0.8 | 25 |
| 2-chloromethyl-1-ethyl-3-hydroxymethyl-5-methoxy-6-methyl-4,7-dioxoindolemethylcarbamate | 1.6 | 1.6 | 1.6 | 12.5 | 12.5 | 1.6 | 12.5 |
| 2-tetrahydropyranyloxymethyl-1-ethyl-3-hydroxymethyl-5-methoxy-6-methyl-4,7-dioxoindole methylcarbamate | 6.25 | 25 | 12.5 | | 6.25 | 3.12 | |
| 2-hydroxyiminomethyl-1-ethyl-3-hydroxymethyl-5-methoxy-6-methyl-4,7-dioxoindole methylcarbamate | 1.6 | 6.25 | 3.12 | 12.5 | 6.25 | | 25 |
| 2-carboxamido-1-ethyl-3-hydroxymethyl-5-methoxy-6-methyl-4,7-dioxoindolemethylcarbamate | 6.25 | 12.5 | 6.25 | 50 | 6.25 | | 50 |
| 1-ethyl-3-hydroxymethyl-5-methylamino-2,6-dimethyl-4,7-dioxoindole carbamate | 25 | 25 | 25 | | 25 | 6.25 | |
| 1-ethyl-3-hydroxymethyl-5-methoxy-2,6-dimethyl-4,7-dioxoindole benzylcarbamate | 1.6 | 12.5 | 25 | 25 | 50 | | |
| 1-ethyl-3-hydroxymethyl-5-methoxy-2,6-dimethyl-4,7-dioxoindole 2-methylthiopropylcarbamate | 3.1 | 6.25 | 6.25 | 12.5 | 25 | 1.6 | |
| 1-ethyl-3-hydroxymethyl-5-methoxy-2,6-dimethyl-4,7-dioxoindole N-methyl-(3-dimethylaminopropyl) carbamate | 1.6 | 3.12 | 3.12 | 3.12 | 3.12 | | 25 |

In addition, the novel compounds of the present invention possess activity both orally and parenterally against *Staphylococcus aureus*, strain Smith, infections in mice. *Staphylococcus aureus*, strain Smith, has been studied and described by J. M. Smith and R. J. Dubos in Journ. Expt. Med. 103, 87 (1956), at the Rockefeller Institute. *Staphylococcus aureus*, strain Smith, is coagulase positive, tellurite negative and is sensitive to tetracycline, penicillin, streptomycin, erythromycin, carbomycin, neomycin, chloramphenicol and novobiocin in vitro. Attempts have been made for phage typing of this strain, but it has been determined that it is non-typable.

The effective dose at which 50% of the test animals were saved ($ED_{50}$) was determined against *Staphylococcus aureus*, strain Smith, infections in mice by the subcutaneous route. The $ED_{50}$ values thus determined are set forth for a representative group of compounds of the present invention in Table II below.

TABLE II

| Compound | $ED_{50}$ mg./kg. of body weight |
|---|---|
| 1-ethyl-3-hydroxymethyl-5-methoxy-2,6-dimethyl-4,7-dioxoindole carbamate | 8-32 |
| 1-ethyl-3-hydroxymethyl-5-methoxy-2,6-dimethyl-4,7-dioxoindole methylcarbamate | 2-32 |
| 1-ethyl-3-hydroxymethyl-5-methoxy-2,6-dimethyl-4,7-dioxoindole ethylcarbamate | [1] 32 |
| 1-ethyl-3-hydroxymethyl-5-methoxy-2,6-dimethyl-4,7-dioxoindole propylcarbamate | 8-128 |
| 1-ethyl-3-hydroxymethyl-5-methoxy-2,6-dimethyl-4,7-dioxoindole allylcarbamate | 32-128 |
| 1-ethyl-3-hydroxymethyl-5-methoxy-2,6-dimethyl-4,7-dioxoindole phenylcarbamate | 32 |
| 1-ethyl-3-hydroxymethyl-5-methoxy-2,6-dimethyl-4,7-dioxoindole 4-methylpiperazine-1-carboxylate | 32 |
| 1-ethyl-3-hydroxymethyl-5-methoxy-2,6-dimethyl-4,7-dioxoindole butylcarbamate | [1] 32 |
| 1-ethyl-3-hydroxymethyl-5-methoxy-2,6-dimethyl-4,7-dioxoindole dimethylcarbamate | 16-32 |
| 1-ethyl-3-hydroxymethyl-5-methoxy-2,6-dimethyl-4,7-dioxoindole diethylcarbamate | 32-128 |
| 1-ethyl-3-hydroxymethyl-5-methoxy-2,6-dimethyl-4,7-dioxoindole amylcarbamate | [1] 64 |
| 1-ethyl-3-hydroxymethyl-5-ethoxy-2,6-dimethyl-4,7-dioxoindole carbamate | [1] 16 |
| 1-ethyl-3-hydroxymethyl-5-methoxy-2,6-dimethyl-4,7-dioxoindole β-hydroxyethyl carbamate | 4-8 |
| 1-ethyl-3-hydroxymethyl-5-methoxy-2,6-dimethyl-4,7-dioxoindole γ-hydroxypropyl carbamate | [1] 32 |
| 1-ethyl-3-hydroxymethyl-5-methoxy-2,6-dimethyl-4,7-dioxoindole β-ethoxyethyl carbamate | 32-128 |
| 1-ethyl-3-hydroxymethyl-5-methoxy-2,6-dimethyl-4,7-dioxoindole β-cyanoethyl carbamate | 16-32 |
| 1-ethyl-3-hydroxymethyl-5-methoxy-2,6-dimethyl-4,7-dioxoindole 4-(3-dimethylamino propyl)-piperazine 1-carboxylate | [1] 32 |
| 1-methyl-3-hydroxymethyl-5-methoxy-2,6-dimethyl-4,7-dioxoindole methylcarbamate | 32 |
| 1-propyl-3-hydroxymethyl-5-methoxy-2,6-dimethyl-4,7-dioxoindole methylcarbamate | 64-128 |
| 1-iso-propyl-3-hydroxymethyl-5-methoxy-2,6-dimethyl-4,7-dioxoindole methylcarbamate | 32 |
| 1-butyl-3-hydroxymethyl-5-methoxy-2,6-dimethyl-4,7-dioxoindole methylcarbamate | 64-128 |
| 1,2-diethyl-3-hydroxymethyl-5-methoxy-6-methyl-4,7-dioxoindole methylcarbamate | [1] 64 |
| 1-ethyl-3-hydroxymethyl-5-methoxy-6-methyl-2-semicarbazanomethyl-4,7-dioxoindole methylcarbamate | 8-16 |
| 5-amino-1-ethyl-3-hydroxymethyl-2,6-dimethyl-4,7-dioxoindole propylcarbamate | 16-32 |
| 5-benzylamino-1-ethyl-3-hydroxymethyl-2,6-dimethyl-4,7-dioxoindole methylcarbamate | 128 |
| 5-aziridino-1-ethyl-3-hydroxymethyl-2,6-dimethyl-4,7-dioxoindole methylcarbamate | [1] 2 |
| 5-ethoxy-1-ethyl-3-hydroxymethyl-2,6-dimethyl-4,7-dioxoindole methylcarbamate | 8-32 |
| 1-ethyl-3-hydroxymethyl-5-methoxy-2-methyl-4,7-dioxoindole propylcarbamate | 64-128 |
| 1,6-diethyl-3-hydroxymethyl-5-methoxy-2-methyl-4,7-dioxoindole methylcarbamate | [1] 128 |

[1] Approximate.

The novel compounds of the present invention may be prepared by the series of reactions set forth in the following reaction scheme:

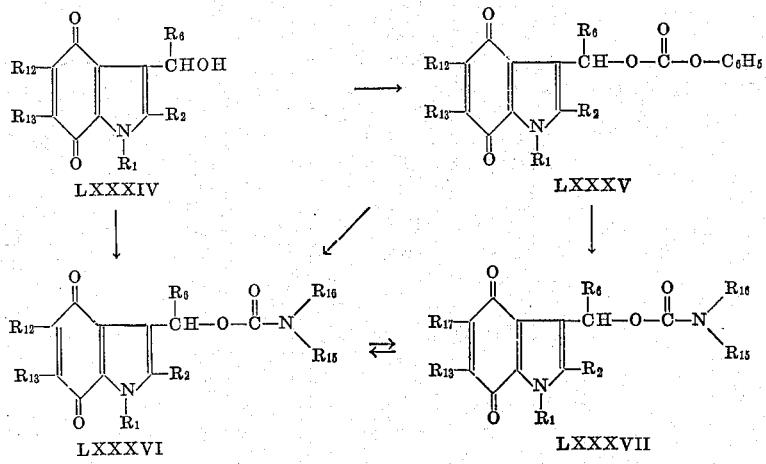

wherein $R_1$ is hydrogen, lower alkyl, ω-halo-lower alkyl, ω-lower alkylalkylthio lower alkyl, ω-tetrahydropyranyloxy lower alkyl or ω-azido lower alkyl; $R_2$ is hydrogen, lower alkyl, carboxamido, lower alkoxycarbonyl, or tetrahydropyranyloxymethyl; $R_6$ is hydrogen or lower alkyl; $R_{12}$ is hydrogen, lower alkyl, alkoxy, halogen or lower alkylthio; $R_{13}$ is hydrogen, lower alkyl, halogen, lower alkoxy, amino, or lower alkylamino; $R_{15}$ is hydrogen, lower alkyl or phenyl; $R_{16}$ is hydrogen, lower alkyl, lower alkyl, lower alkenyl, phenyl lower alkyl, phenyl, halosubstituted-phenyl, lower alkoxy-substituted phenyl, naphthyl, ω-di(lower alkyl)aminoalkyl, hydroxy-lower alkyl, cycloalkyl, ω-cyano lower alkyl, ω-lower alkylthio lower alkyl, ω-lower alkoxy lower alkyl, or amino; and $R_{15}$ and $R_{16}$ taken together with nitrogen

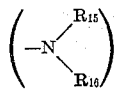

is N-lower alkylpiperazino, cyclopolymethyleneimino containing two to five carbon atoms, bis-lower carboalkoxymethyl, N-(ω-di-lower alkylamino)piperazino, N-(ω-hydroxy lower alkyl)piperazino or morpholino; and $R_{17}$ is hydroxy, amino, mono(lower alkyl)amino, cycloalkylamino, phenyl lower alkylamino, ω-hydroxy lower alkylamino, di(lower alkyl)amino, ω-[di(lower alkyl)amino]-lower alkylamino, or polymethyleneimino containing from two to five carbon atoms. In accordance with this reaction scheme, treatment of a 3-(α-hydroxyalkyl)-4,7-indoloquinone (LXXXIV) with phenyl chloroformate furnishes the corresponding 3-(α-phenoxycarbonyloxyalkyl) derivatives (LXXXV). These esters are particularly useful for the preparation of some of the novel compounds of this invention. Thus, on treatment with a lower alkylamine these esters furnish the 3-(α-lower alkylcarbamoyloxyalkyl) - 5 - lower alkylamino - 4,7-indoloquinones (LXXXVII), while treatment with ammonia or a di(lower alkyl)amine is productive of the 3-(α-carbamoyloxyalkyl) or 3-(α-dialkylcarbamoyloxyalkyl) derivatives (LXXXVI). Moreover, certain compounds of type (LXXXVI) may be prepared by treatment of a 3 - (α - hydroxyalkyl) - 4,7 - indoloquinone (LXXXIV) with a lower alkyl, lower alkenyl, or aryl isocyanate or with a diphenylcarbamoyl chloride.

Treatment of the compounds of type (LXXXVI) with a lower alkylamine and for more prolonged periods with ammonia or various secondary amines affords the 5-amino compounds of type (LXXXVII). Certain of these compounds, particularly the mono alkylamino derivatives, may be selectively hydrolyzed to the 5-hydroxy-para-quinones of type (LXXXVII) where $R_{17}$ is hydroxyl. These 5-hydroxy-para-quinones may be alkylated in the presence of a base such as potassium carbonate with an alkylating agent such as methyl sulfate to give the 5-alkoxy-para-quinones of type (LXXXVI).

Those compounds wherein $R_1$ is ω-hydroxy lower alkyl or $R_2$ is hydroxymethyl may be prepared by mild acid hydrolysis of the corresponding tetrahydropyranyloxymethyl compound. Those compounds wherein $R_1$ is ω-(di-lower alkyl sulfonium)lower alkyl halide or wherein $R_{17}$ is ω-(tri-lower alkylammonium)lower alkylamino halide may be prepared by treatment of the corresponding ω-(lower alkylthio)lower alkyl or ω-(di-lower alkylamino)lower alkylamino compound with a lower alkyl halide.

Those compounds wherein $R_2$ is (lower alkanoyloxy)methyl or (N-lower alkylcarbamoyloxy)methyl may be prepared by treatment of the corresponding hydroxymethyl compound with a lower alkanoic acid anhydride or a lower alkyl isocyanate, respectively. Those compounds wherein $R_2$ is formyl may be prepared by treatment of the corresponding hydroxymethyl compound with an oxidizing agent, preferably manganese dioxide. Those compounds wherein $R_2$ is hydroxyiminomethyl, O-lower alkylhydroxyimino methyl, or semicarbazano methyl may be prepared by treatment of the corresponding formyl compound with hydroxylamine, O-lower alkyl hydroxylamine or semicarbazide, respectively. Those compounds wherein $R_2$ is cyano may be prepared by dehydration of the corresponding hydroxyiminomethyl compound with a reagent such as thionyl chloride or by treatment of the corresponding compound wherein $R_2$ is formyl with O,N-bis-trifluoroacetylhydroxylamine.

Those compounds wherein $R_2$ is chloromethyl or bromomethyl may be prepared by treatment of the corresponding hydroxymethyl compound with a reagent such as thionyl chloride or thionyl bromide. Those compounds wherein $R_2$ is fluoromethyl, lower alkoxymethyl or lower alkanoylthiomethyl may be prepared by treatment of the corresponding chloromethyl compound with silver fluoride, a lower alkoxide or a lower thiolakanoic acid salt (e.g., potassium thiolacetate), respectively. Those compounds wherein $R_2$ is aminomethyl may be prepared by treatment of the corresponding chloromethyl compound with ammonia.

The requisite 3-(α-hydroxyalkyl)-4,7-indoloquinones may be prepared in several ways, principally in accordance with the following reaction scheme:

FLOWSHEET A

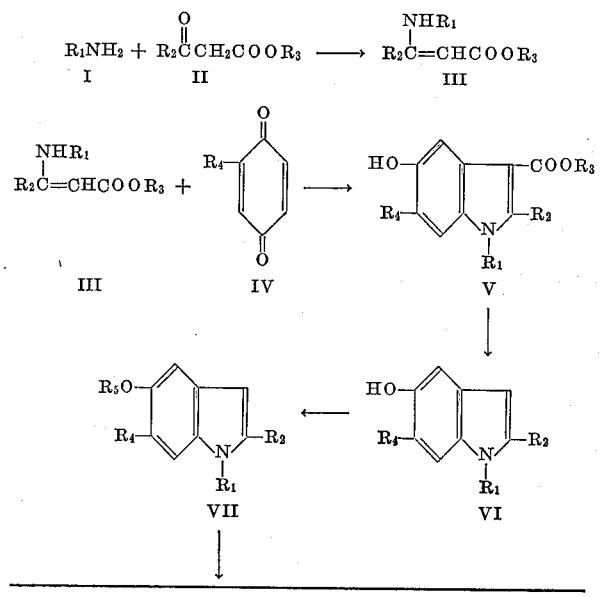

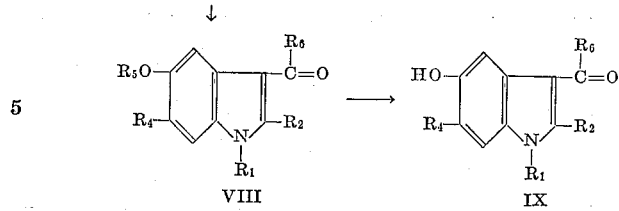

wherein $R_2$, $R_3$, $R_4$ and $R_5$ are lower alkyl and $R_1$ and $R_6$ are hydrogen or lower alkyl. In accordance with this reaction scheme, the indole system (V) is developed by condensation of a substituted 1,4-benzoquinone (IV) with a substituted amino-crotonate ester (III). The latter reagent is prepared by the interaction of an appropriate amine (I) with a β-ketoester (II). The resulting 5-hydroxy-3-indolecarboxylic ester (V) may be converted into other useful 5-hydroxyindoles (IX). Thus, decarbalkoxylation of the 3-indolecarboxylic ester (V) gives the hydroxyindoles (VI); a particularly useful reagent for this transformation being hydrochloric acid. The resulting 5-hydroxyindole (VI) is then O-alkylated to furnish the 5-alkoxyindole (VII). Treatment of this product with phosphorus oxychloride and dimethylformamide or with an alkanoyl anhydride and alkali metal alkanoate affords the corresponding 3-carboxaldehyde or 3-acyl derivative (VIII). The ether function in this class of compounds is then cleaved to give the important 5-hydroxyindoles (IX); this cleavage may be effected with hydriodic acid or aluminum chloride in boiling xylene.

As set forth in the following reaction scheme:

FLOWSHEET B

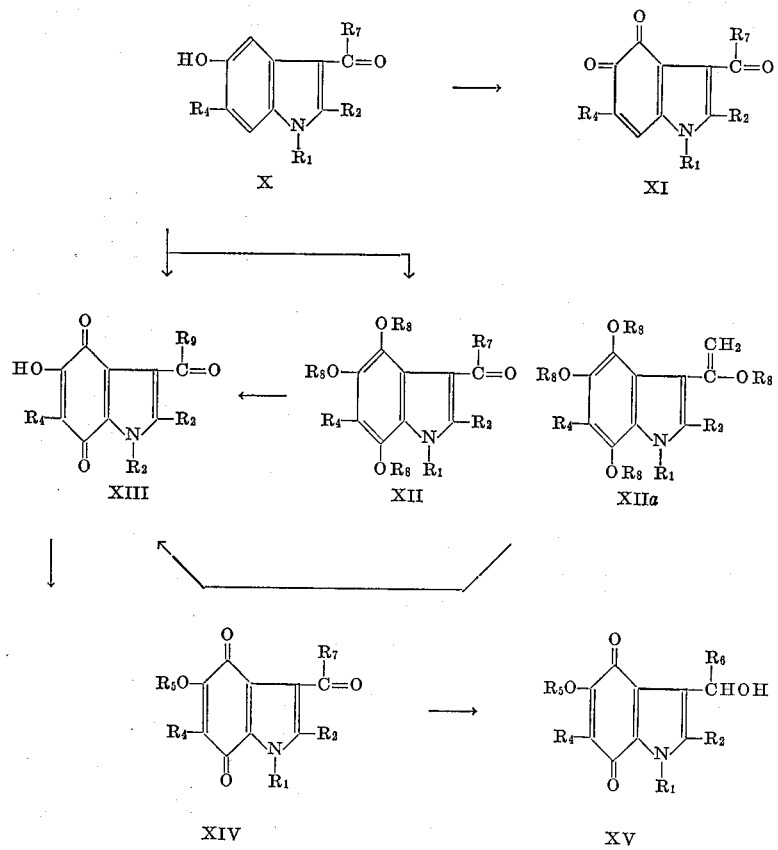

wherein $R_1$, $R_2$, $R_4$ and $R_5$ are lower alkyl; $R_7$ is hydrogen, lower alkyl or lower alkoxy; $R_8$ is lower alkanoyl and $R_9$ is hydrogen, hydroxy or lower alkyl; the previously described 5-hydroxyindoles (X) may be converted into 4,5-ortho-quinones (XI) by any of several methods well known to the art for the conversion of a phenol into an ortho-quinone. Particularly useful for this transformation is potassium nitrosodisulfonate (Fremy's salt) which accomplishes this conversion in one step. Conversion of an ortho-quinone (XI) into the para-quinone (XIII) is achieved via an intermediate 4,5,7-lower alkanoyloxyindole (XII), prepared by treating the ortho-quinone with a lower alkanoyl anhydride and a strong acid such as boron trifluoride. When the ortho-quinone (XI) contains a 3-acyl substituent, concomitant enol acylation of the carbonyl group occurs to give (XIIa). The triacyloxyindoles (XII and XIIa) then may be hydrolyzed to the corresponding trihydricphenols, which on oxidation with air or other oxidizing agents, furnish the corresponding 5-hydroxy-para-quinone (XIII). During the hydrolysis step, a 3-carbalkoxy group is hydrolyzed to the corresponding acid, and the enol acylate (XIIa) formed in the acylation of an ortho-quinone containing a 3-acyl substituent is hydrolyzed to regenerate the 3-acyl substituent. The 5-hydroxy-para-quinones (XIII) may be O-alkylated to give the corresponding 5-alkoxy-para-quinones; of particular value for this conversion are the dialkyl sulfates and tetraalkoxymethanes. The alkylation of a 5-hydroxy-para-quinone containing a 3-carboxy substituent produces the 3-carbalkoxy-5-alkoxy-para-quinone. Reduction of the 5-alkoxy-para-quinones (XIV), followed by oxidation of the hydroquinone thus formed, gives the important 3-(α-hydroxyalkyl)-para quinones (XV). When the 5-alkoxy-para-quinones (XIV) have a carbalkoxy substituent in the 3-position, lithium aluminum hydride is used for this reduction. For those 5-alkoxy-para-quinones (XIV) having a formyl or acyl substituent at the 3-position, sodium borohydride is particularly useful for this reduction.

The important 3-(α-hydroxyalkyl)-4,7-indoloquinones may also be prepared as set forth in the following reaction scheme:

FLOWSHEET C

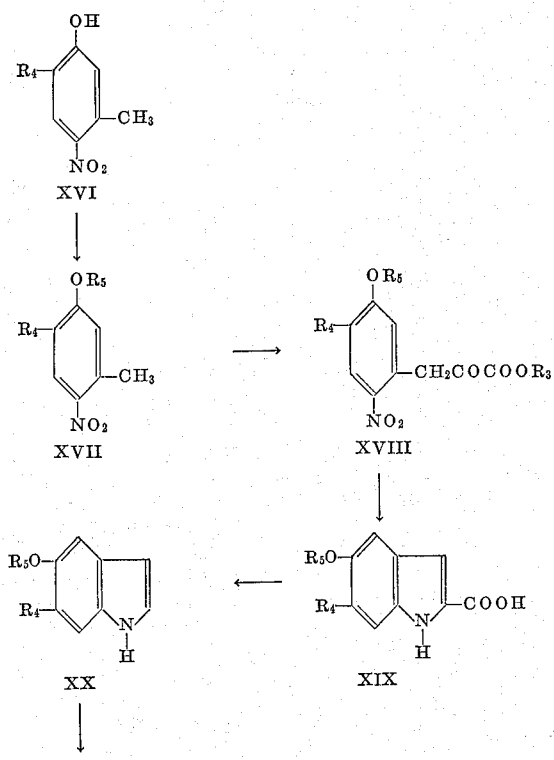

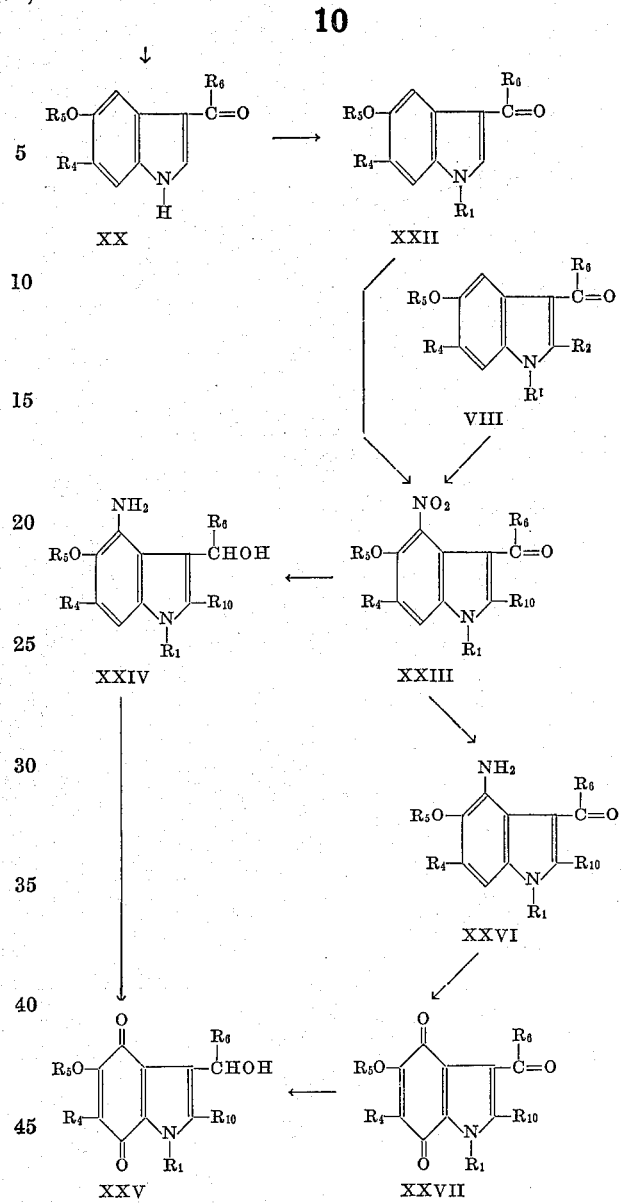

wherein $R_2$, $R_3$, $R_4$ and $R_5$ are lower alkyl; and $R_1$, $R_6$ and $R_{10}$ are hydrogen or lower alkyl. This sequence is of particular value for the preparation of those 3-(α-hydroxyalkyl)-4,7-indoloquinones bearing hydrogen at the 2-position, i.e. compounds such as (XXV) wherein $R_{10}$ is hydrogen. In accordance with this reaction scheme an ortho-alkyl-para-nitro-meta-cresol (XVI) is treated with an alkylating agent such as an alkyl halide or dialkyl sulfate in the presence of base to give the alkyl aryl ether (XVII). Base-catalyzed acylation of (XVII) with a dialkyl oxalate affords the glyoxylic ester (XVIII). Reductive cyclization of this ester furnishes a 6-alkyl-5-alkoxy-2-indolecarboxylic acid (XIX); this reductive cyclization may be achieved with zinc dust in acetic acid, ferrous ammonium sulfate, sodium hydrosulfite or the like. Decarboxylation of the acid (XIX) then gives the indole (XX) which on treatment with phosphorus oxychloride and dimethylformamide or a dimethylalkanoylamide furnishes the 3-formyl- or 3-acylindole (XXI). On treatment with a strong base such as potassium hydroxide or sodium hydride and an alkylating agent such as an alkyl halide or a dialkyl sulfate, the 3-formyl and 3-acylindoles (XXI) afford the corresponding 1-alkyl derivatives (XXII). These compounds (VIII and XXII) are converted into their 4-nitro derivatives (XXIII) by the action of an alkali metal nitrate in sulfuric acid or fuming nitric acid in acetic acid. On hydrogenation in the presence of a noble metal catalyst the 4-nitroindoles (XXIII) are transformed into the 4-amino-3-(α-hydroxyalkyl)indoles (XXIV), which on treatment with an oxidizing agent such as Fremy's salt give the requisite 3-(α-hydroxyalkyl)-4,7-indoloquinones (XXV).

Alternatively, the 4-nitroindoles (XXIII) may be treated with a chemical reducing agent, e.g., ferrous ammonium sulfate or iron in acetic acid, to give the corresponding 4-aminoindoles (XXVI). On treatment with Fremy's salt these last compounds furnish the corresponding para-quinones (XXVII). Reduction of the 3-formyl or 3-acyl substituents in these compounds with sodium borohydride and oxidation of the intermediate hydroquinone with acidic ferric chloride gives the 3-(α-hydroxyalkyl)-4,7-indoloquinones (XXV).

Certain of the requisite 3-(α-hydroxyalkyl)-4,7-indoloquinones may also be obtained in accordance with the following reaction scheme:

FLOWSHEET D (corresponding to XXIII) undergoes concomitant deacylation upon reduction to the 4-aminoindole (corresponding to XXVI). After oxidation of this substance to the paraquinone (corresponding to XXVII) the hydroxymethyl substituent is converted into a 2-tetrahydropyranyloxymethyl derivative by reaction with dihydropyran in the presence of an acid catalyst. Sodium borohydride reduction followed by ferric chloride oxidation then gives a 3-(α-hydroxyalkyl)-4,7-indoloquinone having a 2 - tetrahydropyranyloxmethyl substituent.

Alternatively, the indole esters (XXIX) of Flowsheet D may be converted into their 3-formyl or 3-acyl derivatives (XXXII) by phosphorus oxylchloride and dimethylformamide or dimethylalkanoyl amide. Upon treatment with fuming nitric acid in glacial acetic acid the compounds of type XXXII give the 4-nitroindoles (XXXIII) in mixture with the 4,5-indoloquinones (XXXIV). These last compounds may be transformed into 3-(α-hydroxyalkyl)-4,7-indoloquinones having a 2-carboalkoxy substituent in accordance with procedures outlined in Flowsheet B. The

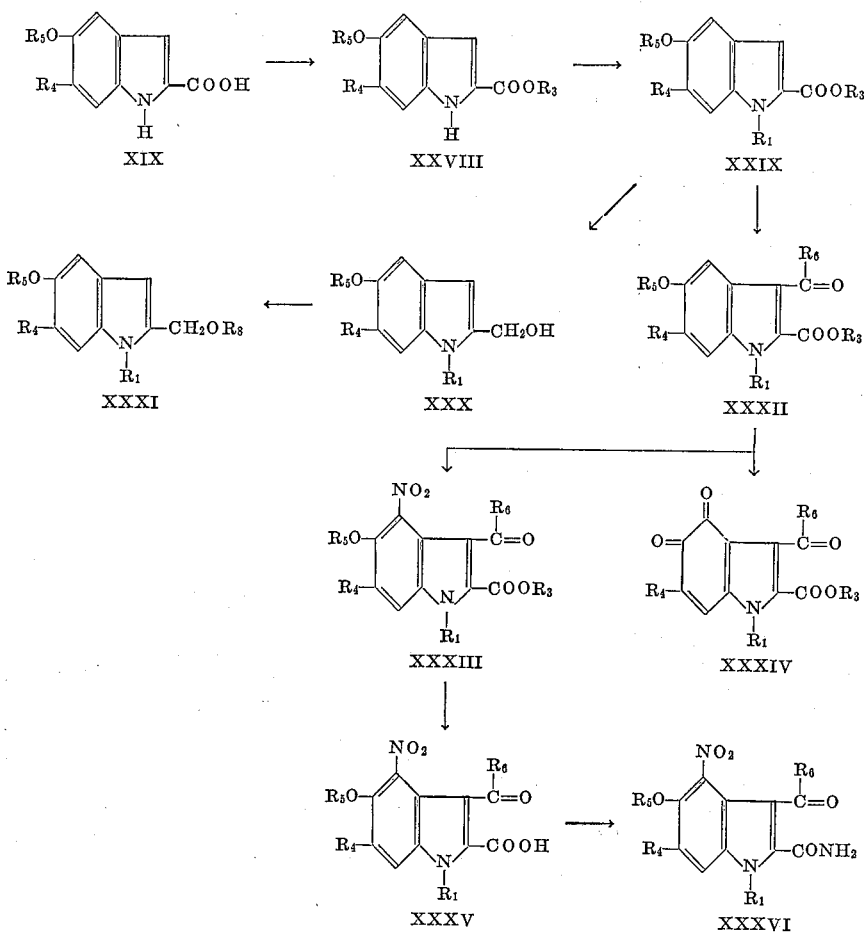

wherein $R_1$ and $R_6$ are hydrogen or lower alkyl; $R_3$, $R_4$ and $R_5$ are lower alkyl; and $R_8$ is lower alkanoyl. In accordance with this flowsheet, esterification of the acids of type XIX (Flowsheet C) gives the corresponding ester (XXVIII). Upon treatment with an organic base and a lower alkyl sulfate these esters are converted into the corresponding N-alkyl compounds (XXIX). Reduction of the latter compounds with lithium aluminum hydride gives the corresponding 2-indolylmethanols (XXX), which on treatment with a lower alkanoic acid anhydride in pyridine are transformed into compounds of type XXXI. These last compounds may be converted into the important 3-(α-hydroxyalkyl)-4,7-indoloquinones as described in Flowsheets A and C. In this conversion, the 4-nitroindole 4-nitroindoles (XXXIII) may also be converted into 3-(α-hydroxyalkyl)-4,7-indoloquinones containing a 2-carboalkoxy substituent as illustrated in Flowsheet C. Additionally, the 4-nitroindoles (XXXIII) are hydrolyzed by methanolic solutions of inorganic bases to give the 4-nitroindole acids (XXXV), which are converted into the amides (XXXVI). The latter conversion is best effected by conversion of the acids (XXXV) into a mixed carbonic acid anhydride, which on treatment with ammonia gives the amides (XXXVI). These compounds are then transformed into 3-(α-hydroxyalkyl)-4,7-indoloquinones having a 2-carboxamido substituent as illustrated in Flowsheet C.

Certain of the requisite 3-(α-ketoalkyl)-4,7 - indoloquinones may be obtained in accordance with the following reaction scheme:

FLOWSHEET E

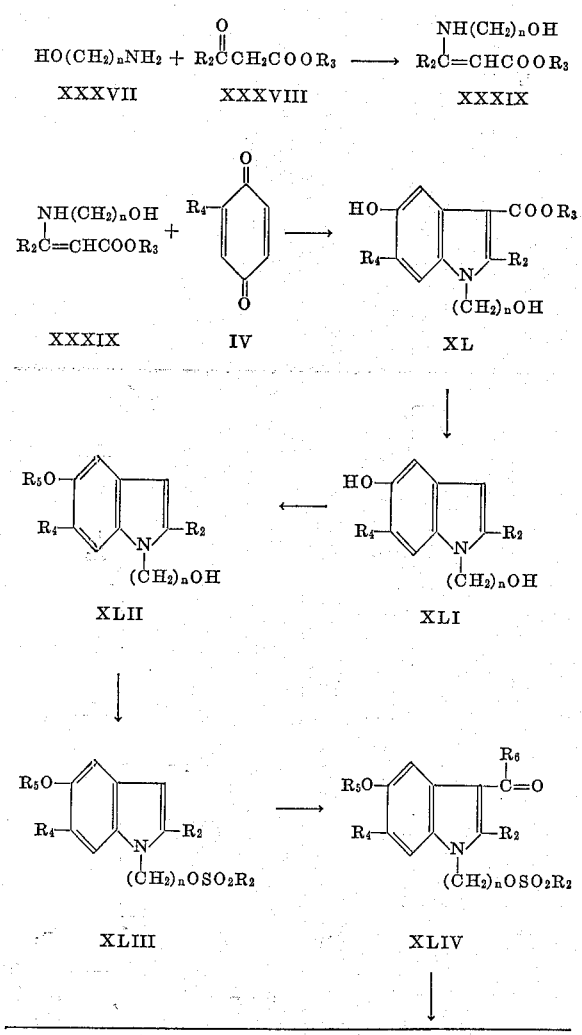

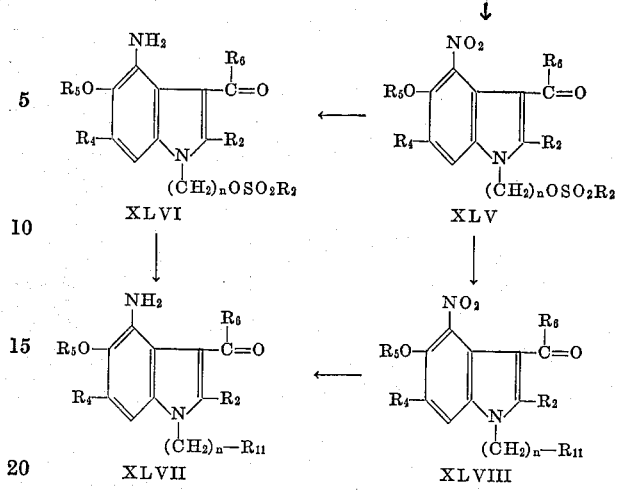

wherein $R_2$, $R_3$, $R_4$ and $R_5$ are lower alkyl; $R_6$ is hydrogen or lower alkyl; $R_{11}$ is halogen, azido, lower alkylmercapto, thiocyano, lower alkanoyloxy, and hydroxy; and $n$ is an integer greater than 1. As illustrated in this flowsheet, use of an ω-hydroxyalkylamine in the processes described in Flowsheets A and C gives the important 4-aminoindoles (XLVI) and 4-nitroindoles (XLV). These compounds are then converted into the ω-substituted alkyl indoles (XLVII) and (XLVIII) on treatment with an inorganic halide, azide, lower alkylmercaptide, thiocyanate or lower alkanoate in an inert solvent such as acetone or dimethylformamide. The resulting 4-nitroindoles (XLVIII) are then reduced to give the 4-aminoindoles (XLVII). When the latter compound contains a 1-(ω-lower alkanoyloxy)alkyl substituent, it is treated with an inorganic base to give a 4-aminoindole (XLVII) having a 1-(ω-hydroxyalkyl) substituent. On reaction with dihydropyran in the presence of acid these compounds give 4-aminoindoles (XLVII) having a 1-ω-tetrahydropyranyloxy)alkyl substituent. The resulting 4-aminoindoles (XLVII) are then converted into 3-(α-hydroxyalkyl)-4,7-indoloquinones having 1-(ω-substituted alkyl) groups in the manner illustrated in Flowsheet C.

Certain of the requisite 3-(α-hydroxyalkyl)-4,7-indoloquinones may also be obtained in accordance with the following reaction scheme:

FLOWSHEET F

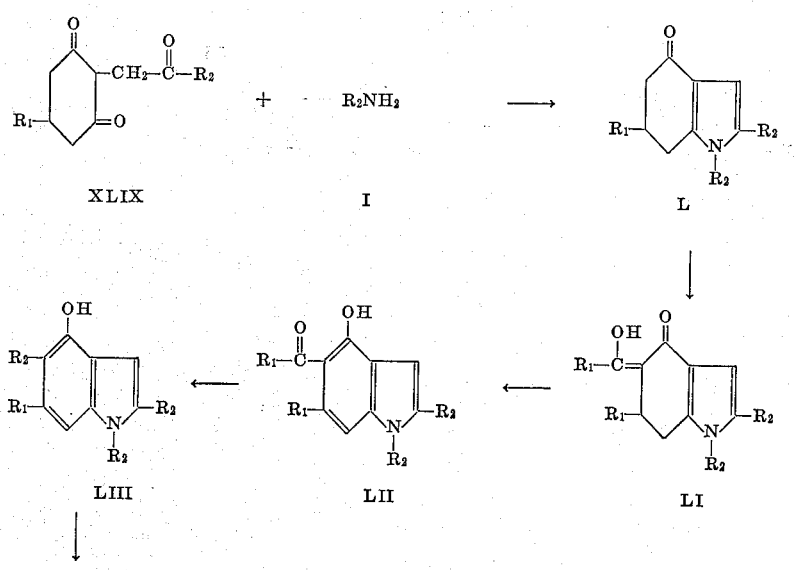

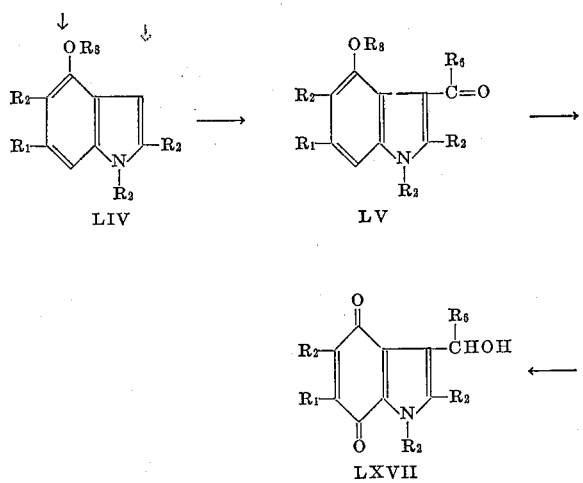

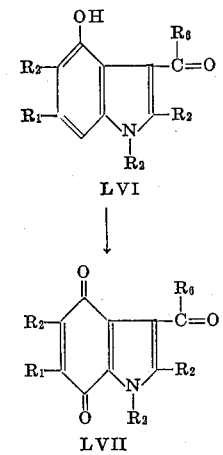

Wherein $R_1$ and $R_6$ are hydrogen or lower alkyl, $R_2$ is lower alkyl and $R_8$ is lower alkanoyl. Thus, reaction of an appropriate alkylamine (I) with a triketone of type (XLIX) is productive of a 4-oxo-4,5,6,7-tetrahydroindole (L). Base-catalyzed acylation of the 4-oxotetrahydroindole (L) furnishes the corresponding 5-formyl or 5-acyl-4-oxo-tetrahydroindole (LI), shown in Flowsheet F in one of the two possible enolic forms. Dehydrogenation of (LI), preferably on treatment with 2,3-dichloro-5,6-dicyanobenzoquinone, affords the 5-acyl-4-hydroxyindoles (LII), catalytic hydrogenation of which, preferably in the presence of palladium-on-carbon catalyst, then furnishes the 5-alkyl-4-hydroxyindole (LIII). After esterifying (for example, with acetic anhydride) the 4-hydroxy group in (LIII) to give (LIV), the 3-formyl or 3-acyl group can be introduced. For example, on treatment of (LIV) with phosphorous oxychloride and dimethylformamide the 3-formyl derivative is obtained. The 3-formyl- or 3-acyl-4-alkanoyloxyindoles (LV) can be converted to the corresponding 4-ols (LVI) on base treatment and the latter compounds may be oxidized to the paraquinone (LVII), preferably by treatment with potassium dinitrosodisulfonate. The quinone aldehydes (LVII) then may be converted to the 5-alkyl-3-(α-hydroxyalkyl)indoloquinones (LXVII) on reduction with a metal hydride, preferably sodium borohydride, and reoxidation of the intermediate hydroquinone, preferably with acidic ferric chloride.

Certain of the requisite 3-(α-hydroxyalkyl)-4,7-indoloquinones may also be obtained in accordance with the following reaction scheme:

FLOWSHEET G

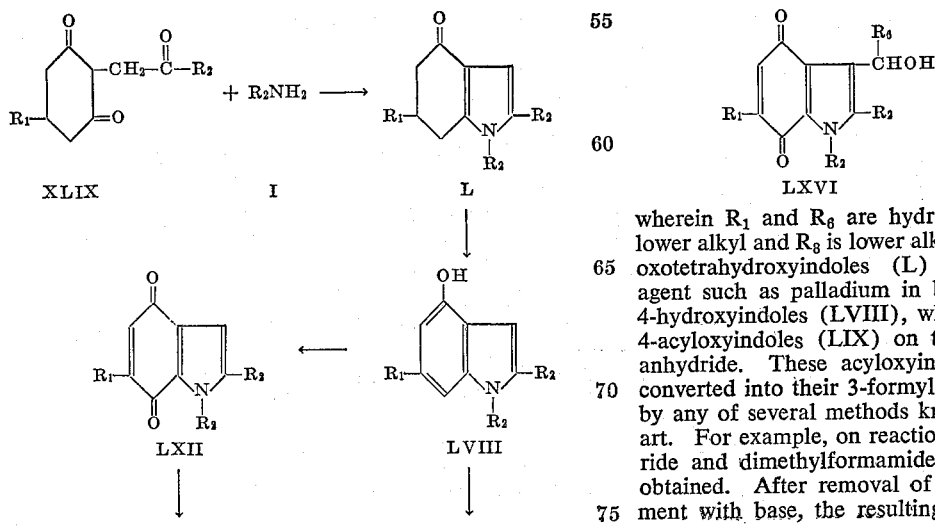

wherein $R_1$ and $R_6$ are hydrogen or lower alkyl, $R_2$ is lower alkyl and $R_8$ is lower alkanoyl. Treatment of the 4-oxotetrahydroxyindoles (L) with a dehydrogenating agent such as palladium in boiling cumene furnish the 4-hydroxyindoles (LVIII), which are converted into the 4-acyloxyindoles (LIX) on treatment with an alkanoyl anhydride. These acyloxyindoles (LIX) may then be converted into their 3-formyl or 3-acyl derivatives (LX) by any of several methods known to those skilled in the art. For example, on reaction with phosphorus oxychloride and dimethylformamide the 3-formyl derivative is obtained. After removal of the O-acyl group by treatment with base, the resulting 4-hydroxy-3-formyl or 3- acylindoles (LXI) may be treated with an oxidizing agent, for example, Fremy's salt, to give the corresponding 3-substituted-4,7-indoloquinones (LXII). In the manner described previously, treatment of the 3-acyl-4,7-indoloquinones (LXII) with a reducing agent such as sodium borohydride followed by oxidation of the intermediate hydroquinone with a reagent such as ferric chloride, produces the 3-($\alpha$-hydroxyalkyl)-4,7-indoloquinone (LXVI).

The 3-formyl or 3-acyl indoloquinones (LXII) may also be prepared from the 4-hydroxyindole (LVIII) by an alternate pathway as follows. Oxidation of (LVIII) with Fremy's salt affords the para-quinone (LXIII) which on reductive alkanoylation, for example on treatment with zinc, acetic anhydride and pyridine, gives the 4,7-bisalkanoyloxy derivative (LXIV). As described previously, the latter compounds (LXIV) may be converted to the 3-formyl or 3-acyl derivatives (LXV), which on basic hydrolysis to the intermediate 4,7-diol corresponding to (LXV) and oxidation, for example, with acidic ferric chloride gives the aforementioned 3-acyl or 3-formyl indoloquinones (LXII).

Certain of the requisite 3-($\alpha$-hydroxyalkyl)-4,7-indoloquinones may also be obtained in accordance with the reaction scheme of Flowsheet H.

FLOWSHEET H

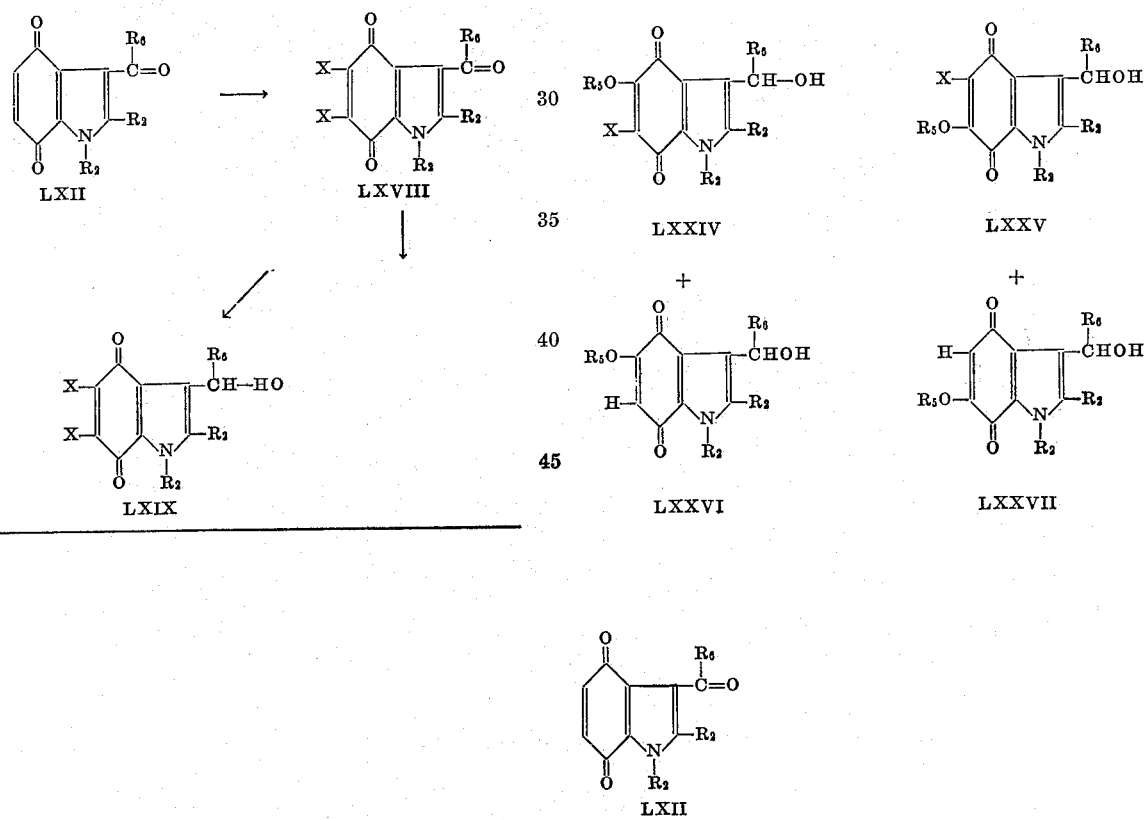

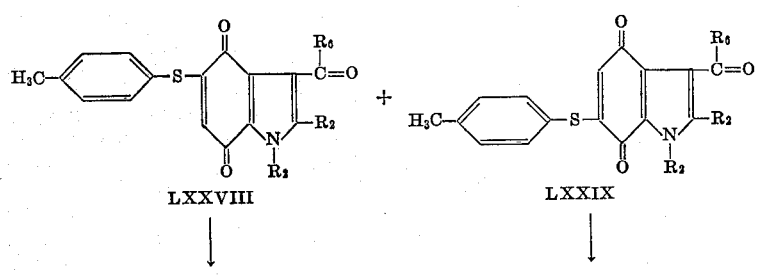

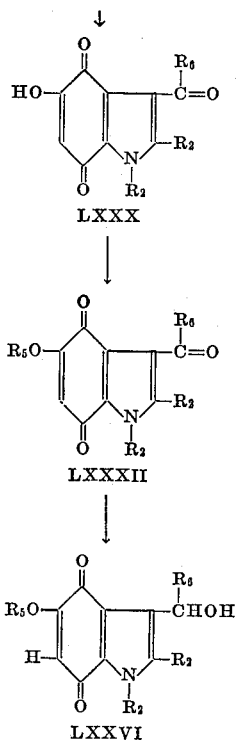
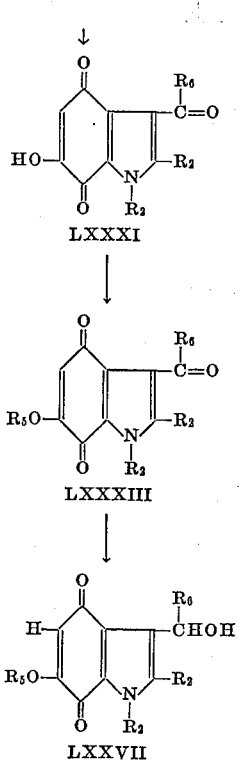

wherein $R_2$ and $R_5$ are lower alkyl, $R_6$ is hydrogen or lower alkyl and X is halogen.

Thus, treatment of the 3-formyl or 3-acyl 4,7-indoloquinone, unsubstituted at positions 5 and 6, (LXII), with halogen, preferably bromine or chlorine, gives the 5,6-dihaloquinone (LXVIII), which, in the aforesaid manner, on reduction and reoxidation of the intermediate hydroquinone furnishes the 5,6-dihalo-3-(α-hydroxyalkyl))-4,7-indoloquinones (LXIX). Further, treatment of the dihaloquinone intermediate (LXVIII) with base, e.g. sodium hydroxide, affords both the 5-hydroxy-6-haloquinone (LXX) and the 6-hydroxy-5-haloquinone (LXXI). Treatment of (LXX) and (LXXI) with an alkylating agent gives the corresponding alkoxy-haloquinones (LXXII) and (LXXIII). Subsequent treatment of (LXXII) and (LXXIII) in the aforesaid manner with sodium borohydride and reoxidation of the intermediate hydroquinone with acidic ferric chloride furnishes the corresponding 5/6 - alkoxy-5/6-halo-3-(α-hydroxyalkyl)-4,7-quinones (LXXIV) and (LXXV), respectively as well as the 6-unsubstituted-5-alkoxyindoloquinone carbinol (LXXVI) and the 5-unsubstituted-6-alkoxy-indoloquinone carbinol (LXXVII), respectively.

The 5- or 6-unsubstituted indoloquinones (LXXVI) and (LXXVII) may be obtained in an alternative manner as follows. Treatment of the 5-6-unsubstituted indoloquinone (LXII) with a mercaptan such as p-toluenethiol furnishes the 5-toluenethioquinone (LXXVIII)

as well as the 6-toluenethioquinone (LXXIX). Caustic hydrolysis of these derivatives gives the corresponding hydroxyquinones (LXXX) and (LXXXI), respectively. O-alkylation of the latter quinones furnishes the 5- and 6-alkoxyquinones (LXXXII) and (LXXXIII), respectively and treatment of these compounds in the aforesaid manner with sodium borohydride and reoxidation of the intermediate hydroquinones with acidic ferric chloride produces (LXXVI) and (LXXVII), respectively.

Certain of the requisite 3-(α-hydroxyalkyl)-4,7-indoloquinones may be obtained in accordance with the reaction scheme of Flowsheet I which follows:

FLOWSHEET I

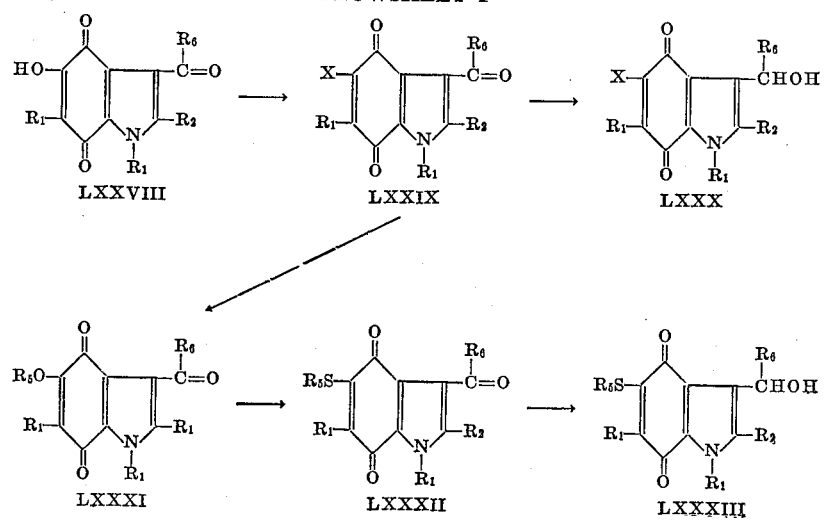

wherein $R_1$ and $R_6$ are hydrogen or lower alkyl, $R_2$ and $R_5$ are alkyl and X is halogen.

Thus, treatment of the 3-acyl- or 3-formyl-5-hydroxy-indoloquinones (LXXVIII) with an appropriate halo-genating agent gives the 5-haloquinones (LXXIX). For example, treatment with a solution of phosphorous oxychloride in dimethylformamide affords a 5-chloro derivative. Subsequent reduction in the aforesaid manner with sodium borohydride and reoxidation of the intermediate hydroquinones with ferric chloride furnishes the 5-halo-3-($\alpha$-hydroxyalkyl)-4,7-indoloquinones (LXXX).

Treatment of 3-acyl- or 3-formyl-5-alkoxy-4,7-indoloquinones (LXXXI) with an alkyl mercaptan in the presence of an acidic catalyst, e.g., hydrochloric acid, affords the 5-alkylthioquinones (LXXXII), which, as previously described, may be converted to the requisite 5-alkylthio-3-($\alpha$-hydroxyalkyl)-4,7-indoloquinones (LXXXIII) by reduction and subsequent reoxidation of the intermediate hydroquinone.

The invention will be described in greater detail in conjuntion with the following specific examples.

*Example 1.—Preparation of ethyl β-ethylaminocrotonate*

With mechanical stirring a stream of ethylamine is introduced into 98.5 g. (100 ml.) of ethyl acetoacetate for 3 hours. During the first hour cooling is required to hold the temperature at 35–40° C. where it is maintained throughout the reaction. Ether (200 ml.) is added, and the water is separated. The ether is removed from the organic phase and the residue is distilled under reduced pressure to give a water white liquid, B.P. 20 mm. 116–118° C., $n_D^{25}$ 1.4941, 104 g.

*Examples 2–6*

By the procedure described in Example 1 the compounds of Table III are obtained.

TABLE III

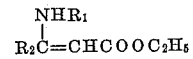

| Example No. | Starting Materials | | Product | | B.p., ° C. (pressure) |
|---|---|---|---|---|---|
| | Ester | Amine | $R_1$ | $R_2$ | |
| 2 | Ethyl acetoacetate | Propylamine | $C_3H_7$ | $CH_3$ | 119–119.5° (14 mm.). |
| 3 | do | i-Propylamine | $(CH_3)_2CH$ | $CH_3$ | 106–106.5° (11 mm.). |
| 4 | do | Butylamine | $C_4H_9$ | $CH_3$ | 129.5–131.0° (14 mm.). |
| 5 | do | Ethanolamine | $CH_2CH_2OH$ | $CH_3$ | Decomposes. |
| 6 | Ethyl propionylacetate | Ethylamine | $C_2H_5$ | $C_2H_5$ | 118–121° (14 mm.). |

*Example 7.—Preparation of ethyl 1-ethyl-5-hydroxy-2,6-dimethyl-3-indolecarboxylate*

A solution of 122 g. (0.0855 mole) of ethyl β-ethylaminocrotonate (Example 1) in 60 ml. of acetone is thoroughly swept with nitrogen and treated with 10.9 g. (0.895 mole) of toluquinone. The deep red solution is heated on the steam-bath for 2 hours, cooled in an ice-bath and filtered to give a dark solid. This material is washed with cold acetone and dried to give 4.45 g. of gray crystals. The combined filtrate and washings are concentrated to about 50 ml. volume and placed in the refrigerator for 16 hours. The solid is collected by filtration and washed with boiling light petroleum to give an additional 3.90 g. of crystals. A sample is recrystallized from dilute ethanol containing a trace of sodium hydrosulfite to give off-white crystals, m.p. 196–198° C.

*Examples 8–14*

In the manner described in Example 7 the compounds of Table IV are prepared.

TABLE IV

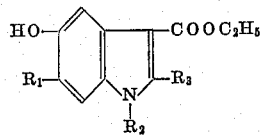

| Example No. | Starting Materials | | Product | | | M.P.,ᵃ ° C. |
|---|---|---|---|---|---|---|
| | | | $R_1$ | $R_2$ | $R_3$ | |
| 8 | Ethyl β-methylaminocrotonate ᵇ | Toluquinone | $CH_3$ | $CH_3$ | $CH_3$ | 222–225 |
| 9 | Product of Example 2 | do | $CH_3$ | $C_3H_7$ | $CH_3$ | 193.5–195.0 |
| 10 | Product of Example 3 | do | $CH_3$ | $(CH_3)_2CH$ | $CH_3$ | 202–203 |
| 11 | Product of Example 4 | do | $CH_3$ | $C_4H_9$ | $CH_3$ | 176–177 |
| 12 | Product of Example 5 | do | $CH_3$ | $CH_2CH_2OH$ | $CH_3$ | 196.0–197.5 |
| 13 | Product of Example 6 | do | $CH_3$ | $C_2H_5$ | $C_2H_5$ | 164–166 |
| 14 | Product of Example 1 | Ethylbenzoquinone ᶜ | $C_2H_5$ | $C_2H_5$ | $CH_3$ | 207–208 |

ᵃ All products are recrystallized from acetone-hexane.
ᵇ S. A. Glickman and A. C. Cope, J. Am. Chem. Soc. 67, 1019 (1945).
ᶜ Clemmensen, Ber., 47, 56 (1914).

*Example 15.—Preparation of 1-ethyl-5-hydroxy-2,6-dimethylindole*

A mechanically stirred mixture of 50.0 g. of ethyl 1-ethyl-5-hydroxy-2,6-dimethyl-3-indolecarboxylate (Example 7) and 500 ml. of 20% hydrochloric acid solution is heated at reflux temperature for 2 hours. The acid solution is diluted with 500 ml. of water, saturated with sodium chloride and extracted well with ethyl acetate. The extracts are dried over magnesium sulfate and evaporated. The residue crystallizes from methylene chloride-petroleum ether (B.P. 30–60°) to give 26.0 g. of crystals, M.P. 113–117° C. An additional 4.8 g. of crystals is obtained by concentration of the mother liquor. This material also has a crystalline modification that melts at 90–92° C. Both forms have identical infrared spectra in carbon tetrachloride solution.

*Examples 16–22*

In the manner described in Example 15 the compounds of Table V are obtained.

TABLE V

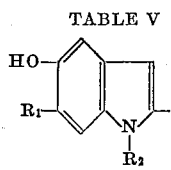

| Example No. | Starting Material | Product | | | M.P.,ª °C. |
|---|---|---|---|---|---|
| | | $R_1$ | $R_2$ | $R_3$ | |
| 16 | Product of Example 8 | $CH_3$ | $CH_3$ | $CH_3$ | 130.0–131.5 |
| 17 | Product of Example 9 | $CH_3$ | $C_3H_7$ | $CH_3$ | 125–128 |
| 18 | Product of Example 10 | $CH_3$ | $(CH_3)_2CH$ | $CH_3$ | 94–95 |
| 19 | Product of Example 11 | $CH_3$ | $C_4H_9$ | $CH_3$ | 73.5–75.0 |
| 20 | Product of Example 12 | $CH_3$ | $CH_2CH_2OH$ | $CH_3$ | 121–123 |
| 21 | Product of Example 13 | $CH_3$ | $C_2H_5$ | $C_2H_5$ | 88–90 |
| 22 | Product of Example 14 | $C_2H_5$ | $C_2H_5$ | $CH_3$ | 80.5–81.5 |

ª All products are recrystallized from methylene chloride-petroleum ether (b.p. 30–60° C.).

*Example 23.—Preparation of 1-ethyl-5-methoxy-2,6-dimethylindole*

To a magnetically stirred solution of 49.1 g. of 1-ethyl-5-hydroxy-2,6-dimethylindole (Example 15) in 300 ml. of ethyl alcohol and 600 ml. of 2 N sodium hydroxide solution is added dropwise over 90 min. at reflux temperature under nitrogen 100 g. (74 ml.) of methyl sulfate. The resulting mixture is heated at reflux temperature for an additional 60 minutes and then extracted with ethyl acetate. The extract is washed with saline, dried over magnesium sulfate and evaporated. The residual brown oil is dissolved in benzene and passed through a magnesia-silica gel column (1.0 x 12.5 in.), benzene being used as the eluting solvent and 250 ml. fractions being collected. Fraction 1 contains 46.9 g. of amber oil and fraction 2 contains 1.0 g. These fractions crystallize on standing. A sample of this material is recrystallized from hexane to give white crystals, M.P. 56–57° C.

*Examples 24–31*

By the procedure given in Example 23 the compounds of Table VI are obtained.

*Example 32.—Preparation of 1-(β-methanesulfonyloxyethyl)-5-methoxy-2,6-dimethylindole*

To an ice-chilled, magnetically stirred solution of 12.7 g. of 1-(β-hydroxyethyl)-5-methoxy-2,6-dimethylindole (Example 20) in 100 ml. of pyridine is added dropwise 10 ml. of methanesulfonyl chloride. The resulting solution is kept at 0–5° C. for 15 hours; water is then added, and the mixture is extracted with methylene chloride. The combined extracts are washed with saline, dried over magnesium sulfate and evaporated. The residue is recrystallized from methylene chloride-petroleum ether (B.P. 30–60°) to give crystals, M.P. 118–120° C. dec.

*Example 33.—Preparation of 2,5-dimethyl-4-nitroanisole*

A well stirred suspension of 16.7 g. (0.1 mole) of 2,5-dimethyl-4-nitrophenol (R. L. Datta and P. S. Varma, J. Am. Chem. Soc., 41, 2042 (1919)) in 50 ml. of water at 40–45° C. is treated alternately and in portions with a solution of 7.0 g. of sodium hydroxide in 18 ml. of water and 12 ml. of methyl sulfate. After 2 hours the mixture is filtered, and the solid is recrystallized from dilute methanol to give 14.5 g. (80% yield) of needles, M.P. 90–92° C.

*Example 34.—Preparation of 5-methoxy-4-methyl-2-nitrophenylpyruvic acid*

Ethanol (6.25 ml.) is added to a mechanically stirred slurry of 2.15 g. (0.055 g.-atoms) of potassium in benzene. After all of the potassium reacts, the solvents are removed by distillation, benzene (50 ml.) is added and removed in the same manner. The cooled residue is slurried in 100 ml. of ether and treated with 7.3 g. (0.05 mole, 6.75 ml.) of ethyl oxalate. To the resulting solution is added a solution of 9.05 g. (0.05 mole) of 2,5-dimethyl-4-nitro-

TABLE VI

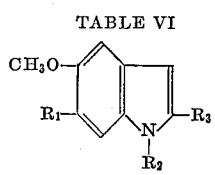

| Example No. | Starting Material | Product | | | State |
|---|---|---|---|---|---|
| | | $R_1$ | $R_2$ | $R_3$ | |
| 24 | 5-hydroxy-2,6-dimethylindole ª | $CH_3$ | H | $CH_3$ | Solid, M.P. 94–96° C. |
| 25 | Product of Example 16 | $CH_3$ | $CH_3$ | $CH_3$ | Solid, M.P. 75–77° C. |
| 26 | Product of Example 17 | $CH_3$ | $C_3H_7$ | $CH_3$ | Oil. |
| 27 | Product of Example 18 | $CH_3$ | $(CH_3)_2CH$ | $CH_3$ | Do. |
| 28 | Product of Example 19 | $CH_3$ | $C_4H_9$ | $CH_3$ | Do. |
| 29 | Product of Example 20 | $CH_3$ | $CH_2CH_2OH$ | $CH_3$ | Solid, M.P. 78–80° C. |
| 30 | Product of Example 21 | $CH_3$ | $C_2H_5$ | $C_2H_5$ | Oil. |
| 31 | Product of Example 22 | $C_2H_5$ | $C_2H_5$ | $CH_3$ | Do. |

ª R.J.S. Beer, et al., J. Chem. Soc., 2029 (1951).

anisole (Example 33) in 150 ml. of ether. A red solid separates immediately and the mixture is mechanically stirred at room temperature for 18 hours and then at reflux temperature for 4 hours. The mixture is filtered, and the solid is washed with ether. The residue is dissolved in water and the solution is heated on the steam-bath for 30 minutes. The solution is cooled and extracted with ether. The aqueous solution is acidified with hydrochloric acid and filtered to give 6.123 g. of crystals, M.P. 167–170° C.

*Example 35.—Preparation of 5-methoxy-6-methyl-2-indolecarboxylic acid*

A solution of 42.0 g. (0.166 mole) of 5-methoxy-4-methyl-2-nitrophenylpyruvic acid (Example 34) in 230 ml. of 17% ammonium hydroxide and 115 ml. of water is treated with a hot solution of 300 g. of ferrous sulfate heptahydrate in 340 ml. of water. The mixture is mechanically stirred at steam-bath temperature for 1 hour and then allowed to cool to room temperature and filtered. The residue is washed with dilute ammonium hydroxide until a test portion becomes only milky on acidification. The combined filtrate and washings are acidified with hydrochloric acid and the solid which separates is collected by filtration. The moist solid is recrystallized from dilute acetic acid to give 19.0 g. (56% yield) of light brown solid, M.P. 240–242° C. (gas evolution).

*Example 36.—Preparation of methyl 5-methoxy-6-methyl-2-indolecarboxylate*

A solution of 4.00 g. of 5-methoxy-6-methyl-2-indolecarboxylic acid (Example 35) in 100 ml. of methanolic hydrogen chloride is heated at reflux temperature for 16 hours. The solvent is evaporated, and the residue is recrystallized from dilute methanol to give white needles, M.P. 147–149° C.

*Example 37.—Preparation of methyl 1-ethyl-5-methoxy-6-methyl-2-indolecarboxylate*

To a mechanically stirred solution of 15.40 g. of methyl 5-methoxy-6-methyl-2-indolecarboxylate (Example 36) in 500 ml. of benzene is added 3.55 g. of a 50.7% suspension of sodium hydride in mineral oil. Gas evolution is noted almost immediately, and a gray flocculent solid separates. The mixture is heated at reflux temperature for 45 minutes, and then 25 ml. of ethyl sulfate is added over 15 minutes. The resulting mixture is heated at reflux temperature for 4 hours and filtered while hot. The solvent is removed from the filtrate by evaporation, and the excess ethyl sulfate is removed at oil-pump pressure. The residue is agitated with 250 ml. of boiling hexane and filtered. The filtrate is concentrated to about one-half its original volume and chilled to give white needles, M.P. 101–102° C.

*Example 38.—Preparation of 1-ethyl-2-hydroxymethyl-5-methoxy-6-methylindole*

A magnetically stirred mixture of 7.00 g. of methyl 1-ethyl-5-methoxy-6-methyl-2-indolecarboxylate (Example 37) and 2.17 g. of lithium aluminum hydride in 470 ml. of ether is heated at reflux temperature for 2.5 hours; stirring is continued for an additional 16 hours. Ethyl acetate (60 ml.) is added cautiously, and then 60 ml. of water is added. The bulk of the ethereal phase is decanted from the aqueous phase which is then diluted with water and extracted with ethyl acetate. The combined organic solutions are washed with saline, dried over sodium sulfate and evaporated. The residue is recrystallized from ether-petroleum ether (B.P. 30–60°) to give white needles, M.P. 103–106° C.

*Example 39.—Preparation of 2-acetoxymethyl-1-ethyl-5-methoxy-6-methylindole*

A solution of 5.49 g. of 1-ethyl-2-hydroxymethyl-5-methoxy-6-methylindole (Example 38) and 7 ml. of acetic anhydride in 60 ml. of pyridine is kept at room temperature for 17 hours. The solution is diluted with water to a volume of about 400 ml. and chilled to give white needles, M.P. 96–97° C.

*Example 40.—Preparation of 1-ethyl-5-methoxy-2,6-dimethyl-3-indolecarboxaldehyde*

To 200 ml. of magnetically-stirred, ice-chilled dimethylformamide is added dropwise at such a rate that the temperature remains at 0–5° C. 55 g. (32.8 ml.) of phosphorus oxychloride. The resulting solution is treated with a solution of 66.35 g. of 1-ethyl-5-methoxy-2,6-dimethylindole (Example 23) in 150 ml. of dimethylformamide at such a rate that the temperature does not exceed 5° C. The ice bath is removed and replaced by a warm water-bath, and the mixture is stirred at 35–40° C. for 1.25 hours. Cracked ice (200 ml.) is added and the mixture is transferred to a 3-l. round-bottom flask containing about 300 g. of cracked ice, 200 ml. of water being used to aid in the transfer. A solution of 250 g. of sodium hydroxide in 650 ml. of water is added dropwise with mechanical stirring until about one-half of the solution has been added; the remainder of the solution is added rapidly. The resulting mixture is heated to the boiling point, diluted with water to a volume of about 2.5 l. and cooled. Filtration gives 70.5 g. of crystals, M.P. 134–136° C.

*Examples 41–50*

By the procedure given in Example 40 the compounds of Table VII are obtained.

TABLE VII

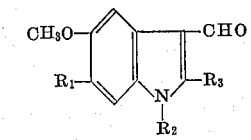

| Example No. | Starting Material | Product | | | M.P., ° C. |
|---|---|---|---|---|---|
| | | $R_1$ | $R_2$ | $R_3$ | |
| 41 | Product of Example 24 | $CH_3$ | H | $CH_3$ | 227.0–228.5 |
| 42 | Product of Example 25 | $CH_3$ | $CH_3$ | $CH_3$ | 174–178 |
| 43 | Product of Example 26 | $CH_3$ | $C_3H_7$ | $CH_3$ | 117.5–119.5 |
| 44 | Product of Example 27 | $CH_3$ | $(CH_3)_2CH$ | $CH_3$ | 172–174 |
| 45 | Product of Example 28 | $CH_3$ | $C_4H_9$ | $CH_3$ | 96–97 |
| 46 | Product of Example 30 | $CH_3$ | $C_2H_5$ | $C_2H_5$ | 95.5–97.0 |
| 47 | Product of Example 31 | $C_2H_5$ | $C_2H_5$ | $CH_3$ | 109–110 |
| 48 | Product of Example 32 | $CH_3$ | $CH_2CH_2OSO_2CH_3$ | $CH_3$ | [1] 187.5–189.0 |
| 49 | Product of Example 39 | $CH_3$ | $C_2H_5$ | $CH_2O\overset{O}{\overset{\|}{C}}CH_3$ | 122.5–123.5 |
| 50 | Product of Example 37 | $CH_3$ | $C_2H_5$ | $COOCH_3$ | 178.5–180.0 |

[1] Dec.

*Example 51.—Preparation of 3-acetyl-1-ethyl-5-methoxy-2,6-dimethylindole*

A mechanically stirred mixture of 12.9 g. of 1-ethyl-5-methoxy-2,6-dimethylindole (Example 23) and 10 g. of sodium acetate in 300 ml. of acetic anhydride is heated at reflux temperature for 6 hours. The reaction mixture is cooled, poured onto crushed ice and stirred for 3 hours. The reaction mixture is warmed on the steam-bath and then stirred for an additional 30 minutes and then extracted with methylene chloride. The extract is successively washed with water, saturated sodium bicarbonate solution and finally with water. The organic solution is dried over anhydrous sodium sulfate and taken to dryness to give 14 g. of an oil. A sample of the oil is distilled and the fraction boiling at 150–170° C./0.2 mm. Hg is crystallized from petroleum ether (B.P. 30–60°) to give a white solid, M.P. 88–89° C.

*Example 52.—Preparation of 1-ethyl-5-hydroxy-2,6-dimethyl-3-indolecarboxaldehyde*

A mixture of 38.4 g. of 1-ethyl-5-methoxy-2,6-dimethyl-3-indolecarboxaldehyde (Example 40) and 46.0 g. of aluminum chloride in 1 l. of xylene is mechanically stirred at reflux temperature for 5 hours. The cooled mixture is treated with cracked ice and digested to give 38.0 g. of pink solid, M.P. 246–250° C. dec. A sample is recrystallized from acetone to give cream-colored crystals, M.P. 256–259° C. dec.

*Example 53.—Preparation of 3-acetyl-1-ethyl-5-hydroxy-2,6-dimethylindole*

A mixture of 12 g. of the crude 3-acetyl-1-ethyl-5-methoxy-2,6-dimethylindole (Example 51) and 13.1 g. of aluminum chloride in 450 ml. of xylene is mechanically stirred at reflux temperature for 5 hours. The cooled mixture is treated with cracked ice and digested to give 8.2 g. of a pink solid, M.P. 250–255° C. A sample is recrystallized from acetone to give cream colored crystals, M.P. 262–265° C. dec.

*Example 54.—Preparation of ethyl 1-ethyl-2,6-dimethyl-4,5-dioxo-3-indolecarboxylate*

To a mechanically stirred solution of 18.0 g. of potassium nitrosodisulfonate in 400 ml. of water and 200 ml. of M/6 potassium dihydrogen phosphate is added a solution of 2.47 g. of ethyl 1-ethyl-5-hydroxy-2,6-dimethyl-3-indolecarboxylate (Example 7) in 500 ml. of acetone. The resulting brown solution becomes purple in 5–10 min. and is allowed to stand at room temperature for 16 hours. The solution is diluted with water and extracted with methylene chloride. The combined extracts are dried over magnesium sulfate and taken to dryness. The residue crystallizes upon trituration with ether. This material is crystallized from acetone-petroleum ether (B.P. 60–70° C.) to give, in three crops, 1.545 g. of black crystals, M.P. 115–118° C.

*Example 55.—Preparation of 1-ethyl-2,6-dimethyl-4,5-dioxo-3-indolecarboxaldehyde*

To a mechanically stirred solution of 50.0 g. (0.187 mole) of potassium nitrosodisulfonate in 1440 ml. of M/6 potassium dihydrogen phosphate solution and 2510 ml. of water is added a solution of 18.75 g. (0.0864 mole) of 1 - ethyl - 5-hydroxy-2,6-dimethyl-3-indolecarboxaldehyde (Example 52) in 3950 ml. of hot acetone. Some solid separates, and an additional 400 ml. of acetone is added. The initially blue solution turns brown on addition of the aldehyde and becomes purple within 5 minutes. Stirring is continued at room temperature for 1 hour. The reaction mixture is then concentrated under reduced pressure, 3200 ml. of distillate being collected. The concentrate is chilled and filtered. The residue is washed well with water and air-dried to give 16.05 g. of black needles, M.P. 205–208° C. A sample is recrystallized from acetone-hexane to give black needles, M.P. 214–216° C.

*Example 56.—Preparation of 3-acetyl-1-ethyl-2,6-dimethyl-4,5-dioxoindole*

To a mechanically stirred solution of 2.05 g. of potassium nitrosodisulfonate in 153 ml. of M/6 potassium dihydrogen phosphate solution and 300 ml. of water is added a solution of 295 mg. of 3-acetyl-1-ethyl-5-hydroxy-2,6-dimethylindole (Example 53) in 300 ml. of hot acetone. The initially blue solution turns brown on addition of the indole and becomes purple within 30 minutes. Stirring is continued at room temperature for 4 hours. The solution is diluted with an equal volume of water and extracted with methylene chloride. The combined extracts are washed with saline, dried over anhydrous sodium sulfate and concentrated to small volume and filtered. The filtrate is evaporated with concomittant addition of petroleum ether (30–60° C.). Once crystallization begins, the mixture is cooled. Filtration gives 176 mg. of dark brown solid, M.P. 162–165° C. A sample is recrystallized from methylene chloride-petroleum ether (30–60° C.) to give dark brown needles, M.P. 164–166° C.

*Example 57.—Preparation of ethyl 1-ethyl-4,5,7-trihydroxy-2,6-dimethyl-3-indolecarboxylate triacetate*

To a solution of 400 mg. of ethyl 1-ethyl-2,6-dimethyl-4,5-dioxo-3-indolecarboxylate (Example 54) in 6 ml. of acetic anhydride is added 0.125 ml. of boron trifluoride etherate; the purple solution immediately turns brown. It is kept at room temperature for 1 hour, and then poured onto cracked ice. After the excess acetic anhydride hydrolyzes, the mixture is extracted with methylene chloride. The extract is taken to dryness and the amorphous residue crystallizes with ether to give 450 mg. of crystals, M.P. 155–158° C. Two recrystallizations from acetone-petroleum ether (B.P. 30–60° C.) give white crystals, M.P. 157–159° C.

*Example 58.—Preparation of 1-ethyl-4,5,7-trihydroxy-2,6-dimethyl-3-indolecarboxaldehyde triacetate*

To a magnetically stirred mixture of 10.00 g. (43.3 mmoles) of 1-ethyl-2,6-dimethyl-4,5-dioxo-3-indolecarboxaldehyde (Example 55) in 150 ml. of acetic anhydride is added 2 ml. of boron trifluoride etherate. All solid quickly dissolves and the purple mixture becomes brown and is stirred at room temperature for 1 hour. Cracked ice is added, and the mixture is stirred at room temperature until the excess acetic anhydride hydrolyzes. The resulting solid is collected by filtration and washed with water to give 12:5 g. of grey solid, M.P. 173–180° C. A sample is recrystallized from acetone-hexane to give white crystals, M.P. 194–195° C.

*Example 59.—Preparation of 4,5,7-triacetoxy-3-acetyl-1-ethyl-2,6-dimethylindole enol acetate*

To a magnetically stirred mixture of 657 mg. of 3-acetyl-1-ethyl-2,6-dimethyl-4,5-dioxoindole (Example 56) in 8 ml. of acetic anhydride is added 0.2 ml. of boron trifluoride etherate. The solid dissolves and the purple mixture becomes dark brown and is stirred at room temperature for several hours. Cracked ice is added, and the mixture is stirred until the excess acetic anhydride hydrolyzes. The resulting solid is collected by filtration and washed with water to give 888 mg. of brown solid. The crude material is triturated with cold methanol to give 467 mg. of a yellow solid, M.P. 195–200° C.

*Example 60.—Preparation of 1-ethyl-5-hydroxy-2,6-dimethyl-4,7-dioxo-3-indolecarboxylic acid*

A mixture of 2.55 g. of ethyl 1-ethyl-4,5,7-trihydroxy-2,6-dimethyl-3-indolecarboxylate triacetate (Example 57) in 100 ml. of water and 20 ml. of 25% sodium hydroxide solution is heated at reflux temperature in an atmosphere of nitrogen with magnetic stirring for 30 minutes. The undissolved solid is collected by filtration to give 0.489 g. of solid. The filtrate is treated with a stream of air for 30 minutes. This purple solution is acidified by dropwise addition of concentrated hydrochloric acid solution, and the resulting solution is extracted with methylene chloride. The extract is taken to dryness and the residue is crystallized from the methylene chloride-petroleum ether (B.P. 60–70° C.) to give 1.010 g. of red needles, M.P. 220–223° C.

*Example 61.—Preparation of 1-ethyl-5-hydroxy-2,6-dimethyl-4,7-dioxo-3-indolecarboxaldehyde*

A mechanically stirred mixture of 30.10 g. (0.080 mole) of 1-ethyl-4,5,7-trihydroxy-2,6-dimethyl-3-indolecarboxaldehyde triacetate (Example 58) in 500 ml. of water and 125 ml. of 25% sodium hydroxide solution is heated at reflux temperature under nitrogen for 1 hour. All solid dissolves and the brown solution is quickly filtered. A stream of air is passed through the filtrate for 35 minutes. The resulting purple solution is acidified by addition of 37% hydrochloric acid solution. Once acid, a red solid separates from the solution. It is extracted into methylene chloride and the extracts are dried over magnesium sulfate and evaporated with concomittant addition of petroleum ether (B.P. 30–60° C.). Once crystallization begins, the mixture is placed in the refrigerator. Filtration gives 13.6 g. of rose needles, M.P. 213–215° C. Concentration of the filtrate gives an additional 2.9 g. of this quinone.

*Example 62.—Preparation of 3-acetyl-1-ethyl-5-hydroxy-2,6-dimethyl-4,7-dioxoindole*

A magnetically stirred mixture of 53 mg. of 4,5,7-triacetoxy-3-acetyl-1-ethyl-2,6-dimethyl indole enol acetate (Example 59) in 3 ml. of water and 0.4 ml. of 25% sodium hydroxide solution is heated at reflux temperature, under nitrogen, until solution occurs. The reaction mixture is filtered and a stream of air is passed through the filtrate for 40 minutes. The resulting purple solution is acidified by addition of 37% hydrochloric acid solution. The acid solution is extracted with methylene chloride and the extracts washed with water. The organic solution is dried over anhydrous sodium sulfate and taken to dryness. The residue is recrystallized from methylene chloride-petroleum ether (30–60° C.) to give 11 mg. red crystals, M.P. 172–175° C.

*Example 63.—Preparation of methyl 1-ethyl-5-methoxy-dimethyl-4,7-dioxo-3-indolecarboxylate*

A magnetically stirred mixture of 681 mg. of 1-ethyl-5-hydroxy-2,6-dimethyl-4,7-dioxo-3-indolecarboxylic acid (Example 60), 5.5 g. of potassium carbonate and 11 ml. of dimethyl sulfate in 250 ml. of acetone is heated at reflux temperature for 45 minutes and then stirred at room temperature for 2 hours. The mixture is filtered and the residue is washed well with acetone. The combined filtrate and washings are concentrated, most of the excess alkylating agent being removed on the steam-bath at water-pump pressure. The residue crystallizes from dilute acetone to give 490 mg. of orange crystals, M.P. 82–83° C.

*Example 64.—Preparation of 1-ethyl-5-methoxy-2,6-dimethyl-4,7-dioxo-3-indolecarboxaldehyde*

A mechanically stirred mixture of 21.9 g. (0.089 mole) of 1-ethyl-5-hydroxy-2,6-dimthyl-4,7 - dioxo-3-indolecarboxaldehyde (Example 61), 100 g. of potassium carbonate and 6.75 g. of dimethyl sulfate in 1 l. of acetone is heated at reflux temperature for 1 hour, whereafter stirring is continued at room temperature for 3 hours. The mixture is filtered and the residue is washed well with acetone. The combined filtrate and washings are evaporated, the excess dimethyl sulfate being removed at oil-pump pressure. The residue is dissolved in 200 ml. of acetone and treated, with magnetic stirring, with about 800 ml. of water. Stirring is continued for 30 minutes, and the resulting mixture is chilled and filtered to furnish 18.9 g. of needles, M.P. 124–127° C. For purification this material is dissolved in methylene chloride and passed through a magnesia-silica gel column, methylene chloride being used as a wash solvent. The eluate is essentially colorless after 2.5 l. is collected. The solvent is removed and the residue is crystallized from methylene chloride-petroleum ether (B.P. 30–60° C.) to give 15.08 g. of red needles, M.P. 133–135° C.

*Example 65.—Preparation of 5-ethoxy-1-ethyl-2,6-dimethyl-4,7-dioxo-3-indolecarboxaldehyde*

1-ethyl-5-hydroxy-2,6 - dimethyl-4,7-dioxo-3-indolecarboxaldehyde (1.0 g.) (Example 61) in tetraethoxymethane is heated at reflux temperature for 3 hours. The mixture is distilled almost to dryness. Methanol (4 ml.) is added and red-orange crystals precipitate. These are collected and washed with methanol to gixe orange-red needles, M.P. 117–119° C.

*Example 66.—Preparation of 3-acetyl-1-ethyl-5-methoxy-2,6-dimethyl-4,7-dioxoindole*

A magnetically stirred mixture of 163 mg. of 3-acetyl-1-ethyl-5-hydroxy-2,6-dimethyl-4,7-dioxoindole (Example 62), 1.6 g. of potassium carbonate and 4 ml. of dimethyl sulfate in 93 ml. of acetone is heated at reflux temperature for 45 minutes and then stirred at room temperature for 2 hours. The mixture is filtered and the residue washed with acetone. The combined filtrate and washings are concentrated, most of the excess alkylating agent being removed on the steam-bath at reduced pressure. The residue is dissolved in a minimum amount of benzene and placed on a magnesia-silica gel column, ether being used as a wash solvent. The combined washings are concentrated to dryness and the residue is recrystallized from methylene chloride-petroleum ether (30–60° C.) to give 91 mg. of orange crystals, M.P. 126–127° C.

*Example 67.—Preparation of 1-ethyl-3-hydroxymethyl-5-methoxy-2,2,6-dimethyl-4,7-dioxoindole*

To a magnetically stirred solution of 334 mg. (1.15 moles) of methyl 1-ethyl-5-methoxy-2,6-dimethyl-4,7-dioxo-3-indolecarboxylate (Example 63) in 25 ml. of tetrahydrofuran is added 197 mg. (5.2 mmoles) of lithium aluminum hydride. The resulting colorless mixture is heated at reflux temperature for 1 hour. Ethereal ferric chloride (1.0 g. in 20 ml.) is slowly added followed by the cautious addition of ethyl acetate and then water. The resulting mixture is destributed between ethyl acetate and water. The organic solution is washed with saline, dried over magnesium sulfate and taken to dryness to give 314 mg. of oil. This material is subjected to chromatography on diatomaceous earth using a n-heptane:ethyl acetate:methanol:water (90:10:17:4) system. Removal of the solvent from hold back volume 3.1–4.2 gives red crystals having melting point 85–87° C.

*Example 68.—Preparation of 1-ethyl-3-hydroxymethyl-5-methoxy-2,6-dimethyl-4,7-dioxoindole*

A magnetically stirred solution of 500 mg. (1.38 mmoles) of 1-ethyl-5-methoxy-2,6-dimethyl-4,7-dioxo-3- indolecarboxaldehyde (Example 64) in 150 ml. of methanol is swept with a stream of nitrogen, heated to reflux temperature and treated with 500 mg. of sodium borohydride. Boiling is continued for 2–3 minutes, and the solution is then stirred under nitrogen at room temperature for 1 hour. Acetone (5 ml.) is added followed by 5 ml. of a 1 N ferric chloride in 0.1 N hydrochloric acid solution. The resulting mixture is distributed between methylene chloride and water. The aqueous layer is extracted an additional two times with methylene chloride. The combined extracts are washed with saline, dried over magnesium sulfate and evaporated. The residue crystallizes from methylene chloride-petroleum ether (B.P. 30–60° C.) to give 377 mg. of red needles, M.P. 85.5–86.5° C.

*Example 69.—Preparation of 5-ethoxy-1-ethyl-3-hydroxymethyl-2,6-dimethyl-4,7-dioxoindole*

In the manner described in Example 68 treatment of 5-ethoxy-1-ethyl-2,6-dimethyl-4,7 - dioxo-3-indolecarboxaldehyde (Example 65) with sodium borohydride in methanol and oxidation of the resulting hydroquinone with ferric chloride is productive of orange needles, M.P. 65–70° C.

*Example 70.—Preparation of 1-ethyl-3-(1'-hydroxyethyl)-5-methoxy-2,6-dimethyl-4,7-dioxoindole*

A magnetically stirred solution of 100 mg. of 3-acetyl-1-ethyl - 5-methoxy-2,6-dimethyl-4,7-dioxoindole (Example 66) in 10 ml. of methanol is heated to reflux and 100 mg. of sodium borohydride is added under nitrogen. The resulting mixture is heated for 1 to 2 minutes and then allowed to stir for 1 hour at room temperature. To the solution is added 1 ml. of acetone, and after 5 minutes, followed by 1 ml. of 1 N ferric chloride in 1 N hydrochloric acid solution. The resulting mixture is distributed between methylene chloride and water. The organic solution is washed with saline, dried over anhydrous sodium sulfate and taken to dryness to give a reddish oil.

*Example 71.—Preparation of 5-methoxy-6-methylindole*

5-methoxy-6-methyl-2-indolecarboxylic acid (Example 35) (3.61 g., 17.6 mmoles) is heated at 260–270° C. until the melt becomes quiescent and then taken to and held briefly at 300° C. The cooled material is dissolved in ether, and this solution is washed with sodium carbonate solution, treated with activated carbon, dried over magnesium sulfate and taken to dryness. The solid is recrystallized from ether-petroleum ether to give 2.12 g. of crystals, M.P. 119–120° C.

*Example 72.—Preparation of 5-methoxy-6-methyl-3-indolecarboxaldehyde*

To 3.5 ml. of dimethylformamide is added with magnetic stirring and ice cooling 1.69 g. (11 mmoles, 1 ml.) of phosphorus oxychloride. To this solution is then added dropwise a solution of 1.61 g. (10 mmoles) of 5-methoxy-6-methylindole (Example 71) in 8 ml. of dimethylformamide. The temperature of the reaction is kept below 10° C. during the addition which requires 20 minutes. A solid separates 15 minutes after the start of the addition. Upon completion of the addition, the ice bath is removed and replaced by a warm water bath. The paste is kept at 30–35° C. with magnetic stirring for 45 minutes. Crushed ice is added to the mixture which is then treated with a solution of 4.5 g. of sodium hydroxide in 20 ml. of water. The mixture is brought to boiling and then chilled in an ice bath to give 1.74 g. of tan solid, M.P. 192–195° C.

*Example 73.—Preparation of 1-ethyl-5-methoxy-6-methyl-3-indolecarboxaldehyde*

A mixture of 1.75 g. (9.2 mmoles) of 5-methoxy-6-methyl-3-indolecarboxaldehyde (Example 72) and 30 ml. of 40% potassium hydroxide solution is heated with mechanical stirring on the steam bath. When the mixture becomes hot, all solid dissolves and 10.0 g. (65 mmoles, 8.5 ml.) of ethyl sulfate is added in five equal portions over 1 hour. The solution is allowed to cool, whereon crystals separate from the aqueous solution. The mixture is extracted with ethyl acetate, and the extract is washed with saline, dried over magnesium sulfate and evaporated. The residue crystallizes from ether-petroleum ether (B.P. 30–60° C.) to give 1.287 g. of crystals, M.P. 92–94° C.

*Example 74.—Preparation of 1-ethyl-5-methoxy-6-methyl-4-nitro-3-indolecarboxaldehyde*

To an ice chilled, magnetically stirred solution of 1.085 g. (5.0 mmoles) of 1-ethyl-5-methoxy-6-methyl-3-indolecarboxaldehyde (Example 73) in 12 ml. of concentrated sulfuric acid is added dropwise over 30 minutes a solution of 0.425 g. (5.0 mmoles) of sodium nitrate in 7 ml. of concentrated sulfuric acid. The resulting solution is stirred for an additional 45 minutes and then poured onto a cracked ice-water mixture. The solid is extracted into methylene chloride and the extract is washed to neutrality with saline, dried with magnesium sulfate and evaporated. The residue is crystallized from acetone-hexane to give 525 mg. of light yellow solid, M.P. 150–152° C.

*Example 75.—Preparation of 1-ethyl-5-methoxy-2,6-dimethyl-4-nitro-3-indolecarboxaldehyde*

In the manner described in Example 74 treatment of 1 - ethyl-5-methoxy-2,6-dimethyl-3-indolecarboxaldehyde (Example 40) with sodium nitrate in sulfuric acid produces orange crystals, M.P. 155–157° C.

*Example 76.—Preparation of methyl 1-ethyl-3-formyl-5-methoxy-6-methyl-4-nitro-2-indolecarboxylate*

To a magnetically stirred solution of 10.0 g. of methyl 1 - ethyl - 3 - formyl-5-methoxy-6-methyl-2-indolecarboxylate (Example 50) in 300 ml. glacial acetic acid is added dropwise 10 ml. of yellow fuming nitric acid; stirring is continued for one hour after completion of the addition. Water is added, and the orange solid is collected by filtration. Recrystallization from acetone-hexane gives light orange crystals, M.P. 182–184° C.

*Example 77.—Preparation of methyl 1-ethyl-3-formyl-6-methyl-4,5-dioxo-2-indolecarboxylate*

The filtrate obtained from Example 76 is extracted with methylene chloride. The combined extracts are washed with saline, dried over sodium sulfate and evaporated. The residue is recrystallized from acetone-hexane to give red needles, M.P. 207–210° C.

*Examples 78–86*

In the manner described in Example 76 the compounds of Table VIII are obtained.

TABLE VIII

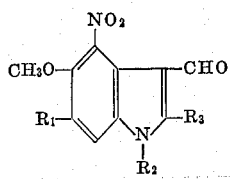

| Example No. | Starting Material | Product | | | M.P., °C. |
|---|---|---|---|---|---|
| | | R₁ | R₂ | R₃ | |
| 78 | Product of Example 41 | CH₃ | H | CH₃ | 280 |
| 79 | Product of Example 42 | CH₃ | CH₃ | CH₃ | 183–187 |
| 80 | Product of Example 43 | CH₃ | C₃H₇ | CH₃ | 136–138 |
| 81 | Product of Example 44 | CH₃ | (CH₃)₂CH | CH₃ | (¹) |
| 82 | Product of Example 45 | CH₃ | C₄H₉ | CH₃ | 127–128 |
| 83 | Product of Example 46 | CH₃ | C₂H₅ | C₂H₅ | 151–154 |
| 84 | Product of Example 47 | C₂H₅ | C₂H₅ | CH₃ | 181.0–182.5 |
| 85 | Product of Example 48 | CH₃ | CH₂CH₂OSO₂CH₃ | CH₃ | 181.5–183.0 |
| 86 | Product of Example 49 | CH₃ | C₂H₅ | CH₂OCOCH₃ | 198–200 |

¹ Crude.

*Example 87.—Preparation of 1-ethyl-3-formyl-5-methoxy-6-methyl-4-nitro-2-indolecarboxylic acid*

A magnetically stirred mixture of 8.0 g. of methyl 1-ethyl-3-formyl-5-methoxy-6-methyl-4-nitro - 2 - indolecarboxylate (Example 76) and 250 ml. of 5% sodium hydroxide is heated at reflux for 1.5 hours. The solution is cooled and acidified with concentrated hydrochloric acid solution. The precipitated solid is collected by filtration and crystallized from acetone to give yellow crystals, M.P. 216–217° C.

*Example 88.—Preparation of 1-ethyl-3-formyl-5-methoxy-6-methyl-4-nitro-2-indolecarboxamide*

To an ice-chilled, magnetically stirred solution of 2.154 g. of 1-ethyl-3-formyl-5-methoxy-6-methyl-4-nitro-2-indolecarboxylic acid (Example 87) and 1.14 ml. of triethylamine in 60 ml. of N,N-dimethylformamide is added dropwise 0.79 ml. of ethyl chlorocarbonate at such a rate that the temperature is maintained between 0–5° C. A solid separates. Ammonia gas is then passed into the reaction mixture for 10 minutes. The resulting mixture is diluted with water and cooled in an ice-bath to give a solid which is recrystallized from acetone to give white crystals, M.P. 252–254° C.

*Example 89.—Preparation of 1-(β-fluoroethyl)-5-methoxy-2,6-dimethyl-4-nitro-3-indolecarboxaldehyde*

A mixture of 5.00 g. of 1-(β-methanesulfonyloxyethyl)-5 - methoxy - 2,6 - dimethyl - 4 - nitro - 3 - indolecarboxaldehyde (Example 85) and 5.00 g. of powdered potassium fluoride dihydrate in 160 ml. of methanol is placed in a stainless steel bomb and heated at 150° C. for 18 hours. The bomb is cooled, and its contents are distributed between methylene chloride and water. The organic layer is washed with saline, dried over magnesium sulfate and evaporated. The residue is recrystallized from acetone-petroleum ether (B.P. 60–70° C.) to give yellow crystals, M.P. 175–178° C.

*Example 90.—Preparation of 1-(β-acetoxyethyl)-5-methoxy-2,6-dimethyl-4-nitro-3-indolecarboxaldehyde*

A mixture of 500 mg. of 1-(β-methanesulfonyloxyethyl) - 5 - methoxy - 2,6 - dimethyl - 4 - nitro - 3 - indolecarboxaldehyde (Example 85) and 1.00 g. of sodium acetate in 25 ml. of dimethylformamide is heated on the steam bath for 15 hours. The mixture is diluted with water, and the precipitated solid is collected by filtration and recrystallized from acetone-petroleum ether (B.P. 30–60° C.) to give crystals, M.P. 179–180° C.

*Example 91.—Preparation of 4-amino-5-methoxy-1,2,6-trimethyl-3-indolecarboxaldehyde*

A mechanically stirred solution of 13.15 g. of 5-methoxy-1,2,6-trimethyl-4-nitro-3 - indolecarboxaldehyde (Example 79) in 875 ml. of alcohol and 375 ml. of water is heated to steam-bath temperature. A solution of 134 g. of ferrous sulfate heptahydrate in 1250 ml. of water is added, and the mixture is heated to boiling. At 30–60 second intervals 10 ml. of concentrated ammonium hydroxide solution is added until a total of 150 ml. is added. The resulting mixture is heated for 15 minutes after the last addition and then filtered. The residual cake is washed thoroughly with methylene chloride. The combined filtrate and washings are shaken well, and the organic layer is separated. The aqueous phase is extracted further with methylene chloride, and the combined organic solutions are washed several times with dilute hydrochloric acid solution. The combined acid washes are neutralized by pouring onto a sodium carbonate slurry. The resulting mixture is extracted well with methylene chloride; the extracts are dried over magnesium sulfate and evaporated. The residue crystallizes from methylene chloride-petroleum ether (B.P. 30–60° C.) to give tan crystals, M.P. 150–154° C.

*Examples 92–98*

In the manner described in Example 91 the compounds of Table IX are obtained.

TABLE IX

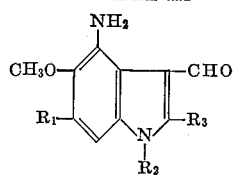

| Example No. | Starting Material | Product | | | M.P., °C. |
|---|---|---|---|---|---|
| | | $R_1$ | $R_2$ | $R_3$ | |
| 92 | Product of Example 75 | $CH_3$ | $C_2H_5$ | $CH_3$ | 117.5–118.5 |
| 93 | Product of Example 83 | $CH_3$ | $C_2H_5$ | $C_2H_5$ | (1) |
| 94 | Product of Example 80 | $CH_3$ | $C_3H_7$ | $CH_3$ | 128–129 |
| 95 | Product of Example 82 | $CH_3$ | $C_4H_9$ | $CH_3$ | 129.5–131.0 |
| 96 | Product of Example 86 | $CH_3$ | $C_2H_5$ | $CH_2OH$ | 182.0–182.5 |
| 97 | Product of Example 86 | $CH_3$ | $C_2H_5$ | $CH_2O\overset{O}{\overset{\|}{C}}CH_3$ | 136–138 |
| 98 | Product of Example 88 | $CH_3$ | $C_2H_5$ | $CONH_2$ | 202–203 |

¹ Oil.

*Example 99.—Preparation of 4-amino-1-(β-methanesulfonyloxyethyl)-5-methoxy-2,6 - dimethyl - 3 - indolecarboxaldehyde*

A mechanically stirred solution of 15.00 g. of 1-(β-methanesulfonyloxyethyl) - 5 - methoxy - 2,6 - dimethyl-4-nitro-3-indolecarboxaldehyde (Example 85) in 450 ml. of glacial acetic acid and 45 ml. of water is heated to steam-bath temperature, and 20.00 g. of iron filings are added in thirteen approximately equal portions over 2 hours. An additional 45 ml. of water is added after 45 minutes, and the reaction is heated 30 minutes after the last addition of iron filings. Water is added, and the mixture is extracted with methylene chloride. The combined extracts are washed with water, potassium carbonate solution and finally with water, dried over magnesium sulfate and evaporated. The residue is recrystallized from methylene chloride-petroleum ether (B.P. 30–60° C.) to give tan crystals, M.P. 133–135° C.

*Examples 100–104*

In the manner described in Example 99 the compounds of Table X are obtained.

TABLE X

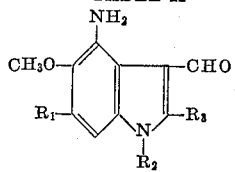

| Example No. | Starting Material | Product | | | M.P., °C. |
|---|---|---|---|---|---|
| | | $R_1$ | $R_2$ | $R_3$ | |
| 100 | Product of Example 78 | $CH_3$ | H | $CH_3$ | (¹) |
| 101 | Product of Example 81 | $CH_3$ | $CH(CH_3)_2$ | $CH_3$ | (²) |
| 102 | Product of Example 84 | $C_2H_5$ | $C_2H_5$ | $CH_3$ | 110.5–112.5 |
| 103 | Product of Example 89 | $CH_3$ | $CH_2CH_2F$ | $CH_3$ | 139–141 |
| 104 | Product of Example 90 | $CH_3$ | $CH_2CH_2O\overset{O}{\overset{\|}{C}}CH_3$ | $CH_3$ | 178–180 |

¹ Crude.
² Oil.

*Example 105.—Preparation of 4-amino-1-(β-azidoethyl)-5-methoxy-2,6-dimethyl-3-indolecarboxyaldehyde*

A mixture of 300 mg. of 4-amino-1-(β-methanesulfonyloxyethyl) - 5 - methoxy - 2,6 - dimethyl - 3 - indolecarboxaldehyde (Example 99) and 300 mg. of sodium azide in 10 ml. of dimethylformamide is heated on the steam bath for 16 hours. The resulting mixture is poured into 150 ml. of water and cooled in an ice-bath to give solid which is recrystallized from methylene chloride-petroleum ether to furnish tan crystals, M.P. 123–124° C.

*Examples 106–108*

In the manner described in Example 105 treatment of 4 - amino - 1 - (β - methanesulfonyloxyethyl) - 5 - methoxy-2,6-dimethyl-3-indolecarboxaldehyde (Example 99) with the appropriate nucleophile gives the compounds of Table XI.

TABLE XI $$\begin{array}{c} NH_2 \\ CH_3O-\phantom{xxx}-CHO \\ CH_2-\phantom{xxx}-CH_3 \\ \phantom{xx}N \\ \phantom{xx}CH_2CH_2X \end{array}$$

| Example No. | Nucleophile | Product X | M.P., °C. |
|---|---|---|---|
| 106 | KSCN | SCN | 190–193 |
| 107 | LiCl | Cl | 120–123 |
| 108 | NaSCH₃ᵃ | SCH₃ | 128.5–130.0 |

ᵃ Acetone solvent.

*Example 109.—Preparation of 4-amino-1-(β-hydroxyethyl)-5-methoxy-2,6-dimethyl-3-indolecarboxaldehyde*

A solution of 2.466 g. of 1-(β-acetoxyethyl)-4-amino-5 - methoxy - 2,6 - dimethyl - 3 - indolecarboxaldehyde (Example 104) in 100 ml. of methanol containing 6 ml. of 10% potassium carbonate solution is stirred at room temperature under nitrogen for 1 hour. Approximately half the solvent is removed after acidification with 0.45 ml. of acetic acid. The concentrate is diluted with 200 ml. of water and chilled to give tan needles, M.P. 157–159° C.

*Example 110.—Preparation of 5-methoxy-1,2,6-trimethyl-4,7-dioxo-3-indolecarboxaldehyde*

A solution of 5.38 g. of 4-amino-1,2,6-trimethyl-5-methoxy-3-indolecarboxaldehyde (Example 91) in 1 l. of acetone is added to a magnetically stirred solution of 25.0 g. of potassium nitrosodisulfonate (Fremy's salt) in 800 ml. of water and 400 ml. of M/6 potassium dihydrogen phosphate solution. Stirring is continued for 2 hours, and the mixture is allowed to stand at room temperature for 15 hours, whereafter it is diluted with water and extracted with methylene chloride. The combined extracts are dried over magnesium sulfate and evaporated. The residue is dissolved in methylene chloride and chromatographed on magnesia-silica gel. The material eluted by methylene chloride is recrystallized from methylene chloride-petroleum ether (B.P. 30–60° C.) to give red-orange needles, M.P. 146–148° C.

*Examples 111–127*

In the manner described in Example 110 the products of Table XII are obtained.

*Example 130.—Preparation of methyl 4,5,7-triacetoxy-3-diacetoxymethyl-1-ethyl-6-methyl-2-indolecarboxylate*

In the manner described in Example 57 treatment of methyl 1-ethyl-3-formyl-6-methyl-4,5-dioxo-2-indolecarboxylate (Example 77) with acetic anhydride and boron trifluoride etherate gives crystals, M.P. 139–149° C.

*Example 131.—Preparation of 1-ethyl-3-formyl-5-hydroxy-6-methyl-4,7-dioxo-2-indolecarboxylic acid*

In the manner described in Example 60 hydrolysis of methyl 4,5,7-triacetoxy-3-diacetoxymethyl-1-ethyl-6-methyl-2-indolecarboxylate (Example 130) with sodium hydroxide solution and subsequent air oxidation of the alkaline solution produces orange crystals, M.P. 161–163° C.

*Example 132.—Preparation of methyl 1-ethyl-3-formyl-5-methoxy-6-methyl-4,7-dioxo-2-indolecarboxylate*

In the manner described in Example 63 treatment of 1-ethyl-3-formyl-5-hydroxy-6-methyl-4,7-dioxo-2-indolecarboxylic acid (Example 131) with methyl sulfate and potassium carbonate in acetone produces a yellow oil.

TABLE XII

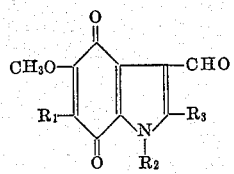

| Example No. | Starting Material | Product | | | M.p., °C. |
|---|---|---|---|---|---|
| | | $R_1$ | $R_2$ | $R_3$ | |
| 111 | Product of Example 100 | $CH_3$ | H | $CH_3$ | 236–240 |
| 112 | Product of Example 92 | $CH_3$ | $C_2H_5$ | $CH_3$ | 125–129 |
| 113 | Product of Example 94 | $CH_3$ | $C_3H_7$ | $CH_3$ | 134–135 |
| 114 | Product of Example 101 | $CH_3$ | $CH(CH_3)_2$ | $CH_3$ | 97–99 |
| 115 | Product of Example 95 | $CH_3$ | $C_4H_9$ | $CH_3$ | 82.5–83.0 |
| 116 | Product of Example 93 | $CH_3$ | $C_2H_5$ | $C_2H_5$ | 76.0–77.5 |
| 117 | Product of Example 102 | $C_2H_5$ | $C_2H_5$ | $CH_3$ | 83.0–83.5 |
| 118 | Product of Example 99 | $CH_3$ | $CH_2CH_2OSO_2CH_3$ | $CH_3$ | 143–144 |
| 119 | Product of Example 97 | $CH_3$ | $C_2H_5$ | $CH_2O\overset{O}{\underset{\|}{C}}CH_3$ | 142–144 |
| 120 | Product of Example 96 | $CH_3$ | $C_2H_5$ | $CH_2OH$ | 128.5–130.0 |
| 121 | Product of Example 103 | $CH_3$ | $CH_2CH_2F$ | $CH_3$ | 114–117 |
| 122 | Product of Example 105 | $CH_3$ | $CH_2CH_2N_3$ | $CH_3$ | 80–81 |
| 123 | Product of Example 106 | $CH_3$ | $CH_2CH_2SCN$ | $CH_3$ | (¹) |
| 124 | Product of Example 107 | $CH_3$ | $CH_2CH_2Cl$ | $CH_3$ | 113.0–113.5 |
| 125 | Product of Example 108 | $CH_3$ | $CH_2CH_2SCH_3$ | $CH_3$ | 77–79 |
| 126 | Product of Example 109 | $CH_3$ | $CH_2CH_2OH$ | $CH_3$ | 129–131 |
| 127 | Product of Example 98 | $CH_3$ | $C_2H_5$ | $CONH_2$ | 197–199 |

¹ Solid.

*Example 128.—Preparation of 1-ethyl-5-methoxy-6-methyl-4,7-dioxo-2-tetrahydropyranyloxymethyl-3-indolecarboxaldehyde*

A solution of 226 mg. of 1-ethyl-2-hydroxymethyl-5-methoxy-6-methyl-4,7-dioxo-3-indolecarboxaldehyde (Example 120), 10 mg. of p-toluenesulfonic acid monohydrate and 92 mg. of dihydropyran in 30 ml. of benzene is stirred at room temperature for 3 hours. The solution is washed with sodium bicarbonate solution and then water, dried over sodium sulfate and evaporated to give a yellow oil.

*Example 129.—Preparation of 5-methoxy-2,6-dimethyl-4,7-dioxo-1-(β-tetrahydropyranyloxyethyl)-3-indolecarboxaldehyde*

In the manner described in Example 128 treatment of 1-(β-hydroxyethyl)-5-methoxy-2,6-dimethyl-4,7-dioxo-3-indolecarboxaldehyde (Example 126) with p-toluenesulfonic acid monohydrate and dihydropyran in ethyl acetate produces a red oil.

*Example 133.—Preparation of 1-ethyl-3-hydroxymethyl-5-methoxy-6-methyl-4,7-dioxoindole*

A mixture of 532 mg. (2.06 mmoles) of 1-ethyl-5-methoxy-6-methyl-4-nitro-3-indolecarboxaldehyde (Example 74) and 105 mg. of a 10% palladium-on-charcoal catalyst in 100 ml. of ethanol containing 1 ml. of water is shaken under hydrogen for 1 hour and 45 minutes. A pressure drop corresponding to 4 molar equivalents of hydrogen is observed. The mixture is filtered to give an ethanolic solution of 4-amino-1-ethyl-3-hydroxymethyl-6-methyl-5-methoxyindole. This solution is added with magnetic stirring to a solution of 5.60 g. of potassium nitrosodisulfonate in 40 ml. of water and 120 ml. of M/6 potassium dihydrogen phosphate solution. The blue color is immediately discharged and within 10 minutes an orange color develops. Stirring is continued for 80 minutes, and the solution is diluted with water and extracted thrice with methylene chloride. The organic solution is dried over magnesium sulfate and evaporated. The residue crystallizes from ether-petroleum ether (B.P.

30–60° C.) to give 149 mg. of orange needles, M.P. 78–81° C.

*Example 134.—Preparation of 1-ethyl-3-hydroxymethyl-5-methoxy-2,6-dimethyl-4,7-dioxoindole*

In the manner described in Example 133 a solution of 1 - ethyl-5-methoxy-2,6-dimethyl-4-nitro-3-indolecarboxaldehyde (Example 75) in ethanol is treated with hydrogen in the presence of a 10% palladium-on-charcoal catalyst to give an alcoholic solution of 4-amino-1-ethyl-3 - hydroxymethyl-5-methoxy-2,6-dimethylindole. Oxidation of this substance with potassium nitrosodisulfonate in the manner described in Example 133 produces red-orange needles, M.P. 85–87° C.

*Example 135.—Preparation of methyl-1-ethyl-3-hydroxymethyl - 5 - methoxy-6-methyl-4,7-dioxo-2-indolecarboxylate*

In the manner described in Example 133 hydrogenation of methyl 1-ethyl-3-formyl-5-methoxy-6-methyl-4-nitro-2-indolecarboxylate (Example 76) in the presence of a 10% palladium-on-charcoal catalyst gives an alcoholic solution of methyl 4 - amino-1-ethyl-3-hydroxymethyl-5-methoxy-6-methyl-2-indolecarboxylate. Oxidation of this substance with potassium nitrosodisulfonate in the manner described in Example 133 produces yellow crystals, M.P. 80–82° C.

*Examples 136–151*

In the manner described in Example 68 the compounds of Table XIII are prepared.

*Example 153.—Preparation of 1-ethyl-4,5,6,7-tetrahydro-2-methyl-4-oxoindole*

A mixture of 33 g. of 2-acetonyl-1,3-cyclohexanedione [H. Setter and R. Lauterbach, Ann., 652, 43 (1962)], 20 g. of ethylamine and 135 ml. of methanol is heated in a steel bomb at 150° C. for 12 hours. The methanol is removed by concentration at reduced pressure and the residual mixture is heated with 200 ml. of methylene chloride and 400 ml. of water. The organic layer is washed two times with 5% sodium hydroxide solution, once with water, then dried and concentrated. The crystalline residue is washed with cyclohexane containing a small amount of ether. Recrystallization of this residue from cyclohexane affords 18.8 g. of 1-ethyl-4,5,6,7-tetrahydro-2-methyl-4-oxoindole, M.P. 74–75° C.

*Example 154.—Preparation of 2,6-dimethyl-1-ethyl-4,5,6,7-tetrahydro-4-oxoindole*

In the manner described in Example 153 treatment of 2-acetonyl-5-methyl-1,3-cyclohexanedione [H. Stetter and R. Lauterbach, Ann., 652, 43 (1962)] with ethylamine gives white needles, M.P. 77–79° C.

*Example 155.—Preparation of 1-ethyl-4-hydroxy-2-methylindole*

A mixture of 10.5 g. of 1-ethyl-4-5,6,7-tetrahydro-2-methyl-4-oxoindole (Example 153), 2.5 g. of 10% pallandium-on-charcoal and 50 ml. of cumene is heated at reflux temperature for 3 hours, then cooled and filtered. The filtrate is extracted with 100 ml. of 5% sodium hy-

TABLE XIII

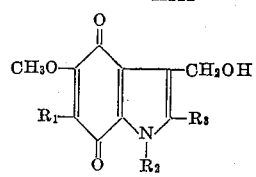

| Example No. | Starting Material | Product | | | M.p., °C. |
|---|---|---|---|---|---|
| | | $R_1$ | $R_2$ | $R_3$ | |
| 136 | Product of Example 111 | $CH_3$ | H | $CH_3$ | 233–235 |
| 137 | Product of Example 110 | $CH_3$ | $CH_3$ | $CH_3$ | (1) |
| 138 | Product of Example 113 | $CH_3$ | $C_3H_7$ | $CH_3$ | (2) |
| 139 | Product of Example 114 | $CH_3$ | $CH(CH_3)_2$ | $CH_3$ | 76–78 |
| 140 | Product of Example 115 | $CH_3$ | $C_4H_9$ | $CH_3$ | 68–70 |
| 141 | Product of Example 116 | $CH_3$ | $C_2H_5$ | $C_2H_5$ | (2) |
| 142 | Product of Example 117 | $C_2H_5$ | $C_2H_5$ | $CH_3$ | 128–129 |
| 143 | Product of Example 128 | $CH_3$ | $C_2H_5$ | $CH_2O\text{-cyclohexyl}$ | (2) |
| 144 | Product of Example 121 | $CH_3$ | $CH_2CH_2F$ | $CH_3$ | 116–118 |
| 145 | Product of Example 122 | $CH_3$ | $CH_2CH_2N_3$ | $CH_3$ | Solid. |
| 146 | Product of Example 123 | $CH_3$ | $CH_2CH_2SH$ | $CH_3$ | (2) |
| 147 | Product of Example 124 | $CH_3$ | $CH_2CH_2Cl$ | $CH_3$ | (2) |
| 148 | Product of Example 125 | $CH_3$ | $CH_2CH_2SCH_3$ | $CH_3$ | (3) |
| 149 | Product of Example 129 | $CH_3$ | $CH_2CH_2O\text{-cyclohexyl}$ | $CH_3$ | (2) |
| 150 | Product of Example 132 | $CH_3$ | $C_2H_5$ | $COOCH_3$ | 83–84 |
| 151 | Product of Example 127 | $CH_3$ | $C_2H_5$ | $CONH_2$ | 200–202 |

[1] Indefinite.
[2] Oil.
[3] Solid.

*Example 152.—Preparation of methyl 1-ethyl-3-hydroxymethyl - 5 - methoxy-6-methyl-4,7-dioxo-2-indolecarboxylate*

In the manner described in Example 68 treatment of methyl 1 - ethyl-3-formyl-5-methoxy-6-methyl-4,7-dioxo-2-indolecarboxylate (Example 132) with sodium borohydride in methanol gives yellow crystals, M.P. 82–84° C.

droxide solution and this extract is layered with methylene chloride and carefully neutralized with acetic acid. The methylene chloride layer is washed with sodium bicarbonate solution, dried and concentrated and the residue is extracted with 500 ml. of boiling n-hexane. White crystals of 1-ethyl-4-hydroxy-2-methylindole form on cooling the extract. They have M.P. 98–102° C.

*Example 156.—Preparation of 2,6-dimethyl-1-ethyl-4-hydroxyindole*

In the manner described in Example 155 treatment of 2,6-dimethyl-1-ethyl - 4,5,6,7 - tetrahydro - 4 - oxoindole (Example 154) with 10% palladium-on-charcoal in cumene gives grey-white prisms, M.P. 141–143° C.

*Example 157.—Preparation of 2,6-dimethyl-1-ethyl-5-hydroxymethylene-4,5,6,7-tetrahydro-4-oxoindole*

An ice-cooled suspension of 64.8 g. of sodium methoxide in 600 ml. of benzene is treated with a solution of 88.8 g. of ethyl formate and 65.7 g. of 2,6-dimethyl-1-ethyl - 4,5,6,7 - tetrahydro - 4 - oxoindone (Example 154) in 600 ml. of benzene. The mixture is stirred at room temperature overnight, then cooled in an ice bath and treated with 1200 ml. of 5% sodium hydroxide solution. The benzene layer is extracted with an additional 10 ml. of 5% sodium hydroxide solution and the combined alkaline extracts are cooled in an ice bath, layered with 1200 ml. of benzene and acidified with 6 N hydrochloric acid. Concentration of the benzene layer affords 70.2 g. (96.1%) of grey solid that gives on recrystallization from petroleum ether greyish-white needles, M.P. 71–74° C.

*Example 158.—Preparation of 2,6-dimethyl-1-ethyl-4-hydroxy-5-indolecarboxaldehyde*

To a solution of 4.51 g. of 2,6-dimethyl-1-ethyl-5-hydroxymethylene-4,5,6,7-tetrahydro-4-oxoindole (Example 157) in 30 ml. of dioxane is added a solution of 4.54 g. of dichlorodicyanobenzoquinone in 30 ml. of dioxane. After one hour the mixture is filtered and the filtrate is concentrated. Recrystallization of the residue for hexane gives 2.28 g. of yellow rods, M.P. 129–130.5° C.

*Example 159.—Preparation of 1-ethyl-4-hydroxy-2,5,6-trimethylindole*

A solution of 1.09 g. of 1-ethyl-4-hydroxy-2,6-dimethyl-5-indolecarboxaldehyde (Example 158) in ethanol is treated with 1.0 g. of 10% palladium-on-carbon and shaken with hydrogen in a Parr apparatus. The mixture is filtered and the filtrate is concentrated to give a yellow oil that crystallizes from hexane, affording 412 mg. of tan solid, M.P. 98–102° C.

*Example 160.—Preparation of 4-acetoxy-1-ethyl-2-methylindole*

A solution of 4.0 g. (22.4 mmole) of 1-ethyl-4-hydroxy-2-methylindole (Example 155) in 75 ml. of water containing 1.35 g. (33.3 mmole) of sodium hydroxide is treated with 3.4 g. (33.3 mmole) of acetic anhydride and 3.0 g. (33.3 mmole) of sodium acetate. After 20 minutes the mixture is filtered and the solid is dissolved in methylene chloride. This solution is washed two times with sodium bicarbonate solution, dried and concentrated and the dark oily desidue is extracted with 40 ml. of boiling n-hexane. On cooling, this extract first gives an oil. The mother liquor is decanted from this oil, affording on further cooling 4-acetoxy-1-ethyl-2-methylindole, white crystals, M.P. 71–73° C.

*Example 161.—Preparation of 4-acetoxy-2,6-dimethyl-1-ethylindole*

In the manner described in Example 160 treatment of 2,6-dimethyl-1-ethyl-4-hydroxyindole (Example 156) with acetic anhydride gives off-white solid, M.P. 61–63° C.

*Example 162.—Preparation of 4-acetoxy-1-ethyl-2,5,6-trimethylindole*

In the manner described in Example 160 treatment of 1-ethyl-4-hydroxy-2,5,6-trimethylindole (Example 159) with acetic anhydride gives pale yellow crystals, M.P. 113–114.5° C.

*Example 163.—Preparation of 4-acetoxy-1-ethyl-2-methyl-3-indolecarboxaldehyde*

To an ice-cooled mixture of 2.0 g. (13.7 mmole) of phosphorous oxychloride and 15 ml. of N,N-dimethylformamide is added dropwise a solution of 3.20 g. (13.7 mmole) of 4-acetoxy-1-ethyl-2-methylindole (Example 160) in 15 ml. of N,N-dimethylformamide. After 90 minutes the resulting yellow solution is poured onto a mixture of ice and 10% sodium carbonate solution. The crystalline solid that forms is washed well with water, dissolved in methylene chloride, washed with sodium bicarbonate solution, dried and concentrated under reduced pressure. Crystallization of the residue from methanol affords white needles, M.P. 165–168° C.

*Example 164.—Preparation of 4-acetoxy-2,6-dimethyl-1-ethyl-3-indolecarboxaldehyde*

In the manner described in Example 163 treatment of 4-acetoxy-2,6-dimethyl - 1 - ethylindole (Example 161) with phosphorus oxychloride and N,N-dimethylformamide gives off-white fine needles, M.P. 168–171° C.

*Example 165.—Preparation of 4-acetoxy-1-ethyl-2,5,6 trimethyl-3-indolecarboxaldehyde*

In the manner described in Example 163 treatment of 4-acetoxy-1-ethyl-2,5,6-trimethylindole (Example 162) with phosphorus oxychloride and N,N-dimethylformamide gives yellow needles, M.P. 165–168° C.

*Example 166.—Preparation of 1-ethyl-4-hydroxy-2-methyl-3-indolecarboxaldehyde*

A mixture of 3.14 g. (12 mmoles) of 4-acetoxy-1-ethyl-2-methyl-3-indolecarboxaldehyde (Example 163), 200 ml. of methanol and 60 ml. of 5% sodium hydroxide solution is stirred and gently warmed until all solid dissolves. It is then cooled, diluted with 200 ml. of water and carefully neutralized with acetic acid. The precipitate that forms is washed well with water, dissolved in methylene chloride solution, washed with sodium bicarbonate solution, dried and concentrated under reduced pressure. Crystallization of the residue from methanol with charcoal decolorization affords 1.16 g. of white needles, M.P. 169–170° C.

*Example 167.—Preparation of 2,6-dimethyl-1-ethyl-4-hydroxy-3-indolecarboxaldehyde*

In the manner described in Example 166 treatment of 4-acetoxy-2,6-dimethyl-1 - ethyl-3 - indolecarboxaldehyde (Example 164) with sodium hydroxide solution gives yellow needles, M.P. 178–180° C.

*Example 168.—Preparation of 1-ethyl-4-hydroxy-2,5,6-trimethyl-3-indolecarboxaldehyde*

In the manner described in Example 166 treatment of 4 - acetoxy-1-ethyl-2,5,6-trimethyl-3-indolecarboxaldehyde (Example 165) with sodium hydroxide solution gives yellow needles, M.P. 162–163.5° C.

*Example 169.—Preparation of 1-ethyl-2methyl-4,7-dioxo-3-indolecarboxaldehyde*

To a stirred solution of 1.98 g. (7.4 mmoles) of potassium nitrosodisulfonate in 180 ml. of M/18 potassium dihydrogen phosphate is added a hot solution of 375 mg. (1.85 mmoles) of 1-ethyl-4-hydroxy-2-methyl-3-indolecarboxaldehyde (Example 166) in 50 ml. of acetone. The mixture is stirred at 40° C. for 10 minutes, then treated with an additional 990 mg. (3.7 mmoles) of potassium nitrosulfonate in 60 ml. of M/18 potassium dihydrogen phosphate and 40 ml. of hot acetone. After 30 minutes the mixture is cooled, diluted with 400 ml. of water, filtered, and the filtrate is extracted with methylene chloride. This extract is washed with water, dried and concentrated. The residue is extracted with ether and this extract is filtered and concentrated. The residue is dissolved in acetone and passed through a column of magnesia-silica gel (10 x 200 mm.). Concentration of the orange eluate affords 296 mg. of orange prisms, M.P. 123–155° C. Recrystallization from acetone-hexane raises the melting point to 148–155° C.

*Example 170.—Preparation of 2,6-dimethyl-1-ethyl-4,7-dioxo-3-indolecarboxaldehyde*

In the manner described in Example 169 treatment of 2,6-dimethyl-1-ethyl-4-hydroxy-3-indolecarboxaldehyde (Example 167) with potassium nitrosodisulfonate (20 mmoles per mmole of substrate) gives orange needles, M.P. 146–149° C.

*Example 171.—Preparation of 1-ethyl-2,5,6-trimethyl-4,7-dioxo-3-indolecarboxaldehyde*

In the manner described in Example 169 treatment of 1-ethyl-4-hydroxy-2,5,6 - trimethyl - 3 - indolecarboxaldehyde (Example 168) with potassium nitrosodisulfonate (8 mmoles per mmole of substrate) gives orange needles, M.P. 125–127° C.

*Example 172.—Preparation of 1-ethyl-2-methyl-4,7-dioxoindole*

A solution of 218 mg. (1.25 mmoles) of 1-ethyl-4-hydroxy-2-methylindole (Example 155) is added to a solution of 1.34 g. (5 mmoles) of potassium nitrosodisulfonate in 80 ml. of M/18 potassium dihydrogen phosphate. After one hour the resulting mixture is diluted with water and extracted with methylene chloride. This extract is washed with water, dried, and concentrated and the residue is redissolved in methylene chloride and passed through a column filled with a magnesia-silica gel adsorbent. Concentration of the orange eluate gives on concentration 168 mg. (68%) of scarlet prisms, M.P. 86–87° C.

*Example 173.—Preparation of 4,7-diacetoxy-1-ethyl-2-methylindole*

To an ice-cooled mixture of 1.13 g. (6.0 mmoles) of 1-ethyl-2-methyl-4,7-dioxoindole (Example 172), 1.1 g. of zinc dust and 10 ml. of acetic anhydride is added 0.5 ml. of pyridine. The resulting mixture is kept at room temperature for 30 minutes, then filtered into sodium bicarbonate solution. After the excess anhydride is hydrolyzed the mixture is extracted with methylene choride. This extract is washed with sodium bicarbonate solution, dried and concentrated to afford 1.23 g. (75%) of yellow oil.

*Example 174.—Preparation of 4,7-diacetoxy-1-ethyl-2-methyl-3-indolecarboxaldehyde*

To an ice-cooled mixture of 690 mg. (4.5 mmoles) of phosphorous oxychloride and 5 ml. of N,N-dimethylformamide is added dropwise a solution of 1.23 g. (4.5 mmoles) of 4,7-diacetoxy-1-ethyl-2-methylindole (Example 173) in 10 ml. of N,N-dimethylformamide. The mixture is stirred one hour at this temperature and 30 minutes at room temperature, then poured into a mixture of 10% sodium carbonate solution and ice. The solid that forms is washed with water, dissolved in methylene chloride solution, washed with sodium bicarbonate solution, dried and concentrated. After the residue crystallizes it is washed with methanol, then recrystallized from methanol. This procedure gives 634 mg. (47%) of very pale blue prisms, M.P. 124–126° C.

*Example 175.—Preparation of 1-ethyl-2-methyl-4,7-dioxo-3-indolecarboxaldehyde*

A mixture of 606 mg. (2 mmoles) of 4,7-diacetoxy-1-ethyl-2-methyl-3-indolecarboxaldehyde (Example 174), 80 mg. (2 mmoles) of sodium hydroxide and 10 ml. of methanol is stirred under nitrogen for 10 minutes. The resulting solution is treated with 1.08 g. (4 mmoles) of ferric chloride hexahydrate in 10 ml. of 0.2 N hydrochloric acid. A methylene chloride extract of the diluted mixture is washed with sodium bicarbonate solution, dried and concentrated to give 310 mg. (71%) of orange solid, M.P. 148–159° C.

*Example 176.—Preparation of 5,6-dibromo-1-ethyl-3-formyl-2-methyl-4,7-dioxoindole*

To an ice-cooled mixture of 1.085 g. of 1-ethyl-2-methyl-4,7-dioxoindole-3-carboxaldehyde (Example 169), 3.28 g. of sodium acetate and 50 ml. of acetic acid is added 1.60 g. of bromine. After the resulting mixture is stirred at room temperature for 24 hours the red crystals that form are collected, washed with acetic acid-water, and recrystallized from methylene chloride-hexane. In this manner 470 mg. of dark red needles, M.P. 200–210° C. dec. are obtained.

*Example 177.—Preparation of 5-bromo-1-ethyl-3-formyl-6-hydroxy-2-methyl - 4,7 - dioxoindole and 6-bromo-1-ethyl-3-formyl-5-hydroxy-2-methyl-4,7-dioxoindole*

To a suspension of 303 mg. of 5,6-dibromo-1-ethyl-3-formyl-2-methyl-4,7-dioxoindole (Example 176) in 50 ml. of methanol is added a solution of 129.6 mg. of sodium hydroxide in 10 ml. of water. The mixture is warmed briefly on a steam bath, then stirred at room temperature for 2.5 hours. The resulting purple solution is extracted with methylene chloride and the aqueous layer is acidified with dilute hydrochloric acid and extracted with methylene chloride. The latter extract is washed with water, dried, and concentrated and the residue is recrystallized from benzene to give 90 mg. of a mixture of 5-bromo-1-ethyl - 3 - formyl-6-hydroxy - 2 - methyl-4,7-dioxoindole and 6-bromo-1-ethyl-3-formyl-5-hydroxy-2-methyl-4-7-dioxoindole, M.P. 205–212° C. dec.

*Example 178.—Preparation of 5-bromo-1-ethyl-3-formyl-6-methoxy-2-methyl - 4,7 - dioxoindole and 6-bromo-1-ethyl-3-formyl-5-methoxy-2-methyl-4,7-dioxoindole*

To a solution of 653 mg. of a mixture of 5-bromo-1-ethyl-3-formyl-6-hydroxy-2-methyl - 4,7 - dioxoindole and 6-bromo-1-ethyl - 3 - formyl - 5 - hydroxy - 2 - methyl-4,7-dioxoindole (Example 177) in 120 ml. of methylene chloride is added a solution of diazomethane (prepared from 472 mg. of N-nitroso-N-methyl-N′-nitroguanidine) in ether. After 30 minutes the resulting solution is extracted with 2% sodium bicarbonate solution, dried and concentrated. The residue is dissolved in 25 ml. of the upper phase and 25 ml. of the lower phase of the system heptane-methyl Cellosolve, mixed with 50 g. of diatomaceous earth and packed atop a column prepared from 300 ml. of the lower phase and 600 g. of diatomaceous earth. Elution of this column with the upper phase gives in hold-back volume 5.6–7.2 (960 ml. per H.B.V.), after concentration and recrystallization 155 mg. of 5-bromo-1-ethyl-3-formyl - 6 - methoxy - 2 - methyl-4,7-dioxoindole as orange plates, M.P. 131–135° C. Concentration of hold-back volumes 7.4–8.4 gives 6-bromo-1-ethyl-3-formyl-5-methoxy-2-methyl - 4,7 - dioxoindole as orange needles, M.P. 180–181° C.

*Example 179.—Preparation of 1-ethyl-3-formyl-2,6-dimethyl-5-methylthio-4,7-dioxoindole*

A solution of 870 mg. of 1-ethyl-3-formyl-5-methoxy-2,6-dimethyl-4,7-dioxoindole (Example 112) in 25 ml. of acetic acid is treated with 1 ml. of concentrated hydrochloric acid and 2 ml. of methyl mercaptan. After 2 days the mixture is poured into a large volume of water and extracted with methylene chloride. This extract is washed with water and sodium bicarbonate solution, dried and concentrated. The residue is dissolved in methanol, treated with excess ferric chloride, diluted with water and extracted with methylene chloride. The red oil obtained on concentration of this extract is dissolved in 25 ml. of the upper and 37.5 ml. of the lower phase of the system methanol-heptane, mixed with 50 g. of diatomaceous earth and packed atop a column prepared from 375 ml. of the lower phase and 500 g. of diatomaceous earth. Elution of this column with the upper phase gives in hold-back volume 2.3–3.1 (750 ml. per H.B.V.), after concentration and recrystallization from hexane, 23 mg. of orange rods, M.P. 126–128° C.

*Example 180.—Preparation of 1-ethyl-5-n-hexyloxy-2,6-dimethyl-4,7-dioxo-3-indolecarboxaldehyde*

A mixture of 200 mg. of 1-ethyl-5-hydroxy-2,6-dimethyl-4,7-dioxo-3-indolecarboxaldehyde (Example 61), 1.0 ml. of tetra-n-hexylorthocarbonate and 2 ml. of xylene is heated at reflux temperature for 2 hours. The mixture is cooled, diluted with ether and extracted with 5% sodium bicarbonate solution and the organic layer is dried and concentrated. The oily residue is purified by adsorption chromatography on a magnesia-silica gel column with methylene chloride containing 2% of acetone as eluent. Concentration of the orange eluate gives 206 mg. of viscous oil.

*Example 181.—Preparation of 1-ethyl-2-methyl-5-p-toluenethio - 4,7 - dioxo-3-indolecarboxaldehyde, 1-ethyl-2-methyl-6-p-toluenethio - 4,7 - dioxo-3-indolecarboxaldehyde and 5,6-bis-p-toluenethio-1-ethyl - 2 - methyl-4,7-dioxo-3-indolecarboxaldehyde*

A suspension of 4.34 g. (20 mmoles) of 1-ethyl-2-methyl-4,7-dioxoindole-3-carboxaldehyde (Example 169) in 200 ml. of ethanol is treated with 1.87 g. of (15 mmoles) of p-toluenethiol and stirred at room temperature for 66 hours. It is then treated with 8.10 g. (30 mmoles) of ferric chloride hexahydrate in 20 ml. of ethanol. After 20 minutes, an additional 1.24 g. (10 mmoles) of p-toluenethiol is added, the mixture is stirred 16 hours and 4.05 g. (15 mmoles) of ferric chloride hexahydrate in 10 ml. of ethanol is added. The mixture is diluted with water and extracted with methylene chloride. This extract is washed with water, dried and concentrated and the oily residue is treated with ether. Extraction of the residual solid with hot methanol leaves as insoluble brown solid 1.47 g. of 5,6-bis-p-toluenethio-1-ethyl-2-methyl-4,7-dioxo - 3 - indolecarboxaldehyde, M.P. 204° C. Partial concentration of the ether solution affords a solid that gives on recrystallization from methanol 245 mg. of 1-ethyl-2-methyl-5-p-toluenethio - 4,7 - dioxo-3-indolecarboxaldehyde as red needles, M.P. 175–178° C. Complete concentration of the remaining ether solution gives a dark tar that is purified by adsorption chromatography on a magnesia-silica gel column with methylene chloride containing 5% acetone. Concentration of the eluate affords 2.92 g. of 1-ethyl-2-methyl-6-p-toluenethio-4,7-dioxo-3-indolecarboxaldehyde, M.P. 189–190° C. after recrystallization from methanol.

*Example 182.—Preparation of 1-ethyl-6-hydroxy-2-methyl-4,7-dioxo-3-indolecarboxaldehyde*

A mixture of 470 mg. of 1-ethyl-2-methyl-6-p-toluenethio-4,7-dioxo-3-indolecarboxaldehyde (Example 181), 75 ml. of methanol, 10 ml. of water and 4.9 ml. of 10% sodium hydroxide solution is heated on a steam bath for 10 minutes, diluted with 500 ml. of water and extracted with methylene chloride. The aqueous phase is acidified with hydrochloric acid and extracted with methylene chloride and this extract is treated with 2% sodium bicarbonate solution. The resulting blue aqueous layer is acidified and extracted with methylene chloride and this extract is dried and concentrated. Treatment of the residue with ether gives 137 mg. of orange prisms that do not melt below 300° C.

*Example 183.—Preparation of 1-ethyl-5-hydroxy-2-methyl-4,7-dioxo-3-indolecarboxaldehyde*

In the manner described in Example 182 treatment of 1 - ethyl - 2 - methyl - 5 - p - toluenethio - 4,7-dioxo-3-indolecarboxaldehyde (Example 181) with methanolic sodium hydroxide gives orange prisms that do not melt below 300° C.

*Example 184.—Preparation of 1-ethyl-6-methoxy-2-methyl-4,7-dioxo-3-indolecarboxaldehyde*

To a solution of 156 mg. of 1-ethyl-6-hydroxy-2-methyl-4,7-dioxo-3-indolecarboxaldehyde (Example 182) in 35 ml. of methylene chloride is added a solution of diazomethane (prepared from 142 mg. of N-nitroso-N-methyl-N′-nitroguanidine) in 15 ml. of ether. The resulting solution is kept overnight and then concentrated. Treatment of the residue with ether affords orange-red prisms, M.P. 165–175° C.

*Example 185.—Preparation of 1-ethyl-5-methoxy-2-methyl-4,7-dioxo-3-indolecarboxaldehyde*

In the manner described in Example 184 treatment of 1 - ethyl - 5 - hydroxy - 2 - methyl - 4,7 - dioxo - 3 - indolecarboxaldehyde (Example 183) with diazomethane gives copper-colored plates, M.P. 159–168° C.

*Example 186.—Preparation of 5-chloro-1-ethyl-2,6-dimethyl-4,7-dioxo-3-indolecarboxaldehyde*

To an ice-cooled mixture of 1.22 g. (8 mmoles) of phosphorous oxychloride and 4 ml. of N,N-dimethylformamide is added a solution of 988 mg. (4 mmoles) of 1 - ethyl - 5 - hydroxy - 2,6 - dimethyl - 4,7 - dioxo - 3-indolecarboxaldehyde (Example 61) in 12 ml. of dimethylformamide. The mixture is heated on a steam bath for 30 minutes, cooled, poured onto ice and treated with methylene chloride and 5% sodium bicarbonate solution. The organic layer is washed with 5% sodium bicarbonate solution, dried and concentrated under reduced pressure. The residue is dissolved in 90% methylene chloride-10% acetone and passed through a magnesia-silica gel column (24 times 120 mm.). Concentration of the orange eluate affords orange prisms, M.P. 145–150° C.

*Examples 187–196*

By the procedure of Example 68 the compounds of Table XIV are obtained.

TABLE XIV

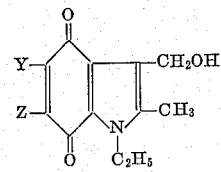

| Example No. | Y | Z | Starting Compound | M.p., ° C. |
|---|---|---|---|---|
| 187 | C₂H₅O | CH₃ | Product of Ex. 65 | |
| 188 | Cl | CH₃ | Product of Ex. 186 | 110–117 |
| 189 | C₆H₁₃O | CH₃ | Product of Ex. 180 | 70–71 |
| 190 | CH₃S | CH₃ | Product of Ex. 179 | 60–90 |
| 191 | H | H | Product of Ex. 169 | 90–95 |
| 192 | Br | Br | Product of Ex. 176 | 115–122 |
| 193 | H | CH₃ | Product of Ex. 170 | 127–129 |
| 194 | CH₃ | CH₃ | Product of Ex. 171 | 175–178 |
| 195 | CH₃O | H | Product of Ex. 185 | 164–165 |
| 196 | H | CH₃O | Product of Ex. 184 | |

*Example 197.—Preparation of 6-bromo-1-ethyl-3-hydroxymethyl-5-methoxy-2-methyl-4,7-dioxoindole and 1-ethyl-3-hydroxymethyl-5-methoxy-2-methyl-4,7-dioxindole*

A suspension of 343 mg. of 6-bromo-1-ethyl-3-formyl-5-methoxy-2-methyl-4,7-dioxoindole (Example 178) in 100 ml. of methanol is stirred under nitrogen for 10 minutes, treated with a slurry of 340 mg. of sodium borohydride in 10 ml. of ethanol, warmed briefly on a water bath and stirred at room temperature for 30 minutes. Acetone (5 ml.) is added and after 5 minutes a solution of 540 mg. of ferric chloride hexahydrate in 20 ml. of 0.1 N hydrochloric acid is added. The resulting mixture is treated with water and methylene chloride. After washing with sodium bicarbonate the organic layer is dried and concentrated. The residue is dissolved in 6.5 ml. of the upper phase and 6.5 ml. of the lower phase of the system methanol-hexane, mixed with 13 g. of diatomaceous earth and packed atop a column prepared from 200 g. of diatomaceous earth and 100 ml. of the lower phase just described. Elution with the upper phase gives three colored bands on the column. These bands are separately collected and concentrated. The second band gives 80 mg. of 6-bromo-1-ethyl-3-hydroxymethyl - 5 - methoxy - 2 - methyl - 4,7 - dioxoindole as red solid, M.P. 114–138° C. The third band gives 70 mg. of 1-ethyl-3-hydroxymethyl-5-methoxy-2-methyl-4,7-dioxoindole as red needles, M.P. 164–165° C.

*Example 198.—Preparation of 5-bromo-1-ethyl-3-hydroxymethyl-6-methoxy-2-methyl-4,7-dioxoindole and 1-ethyl-3-hydroxymethyl-6-methoxy-2-methyl-4,7-dioxoindole*

Chromatographic separation in the manner described in Example 197 of the mixture of products obtained by treatment of 5 - bromo - 1 - ethyl - 3 - formyl - 6 - methoxy-2-methyl-4,7-dioxoindole (Example 178) in the manner described in Example 197 gives four colored bands. These bands are separately collected and concentrated. The third band gives 5-bromo-1-ethyl-3-hydroxymethyl-6-methoxy-2-methyl-4,7-dioxoindole as dark red needles, M.P. 137–138.5° C. The fourth band gives 1-ethyl-3-hydroxymethyl - 6 - methoxy - 2 - methyl - 4,7 - dioxoindole as orange needles.

*Example 199.—Preparation of 1-ethyl-3-hydroxymethyl-5-methoxy-2,6-methyl-4,7-dioxoindole methyl carbonate*

A solution of 150 mg. of 1-ethyl-3-hydroxymethyl-5-methoxy-2,6-dimethyl-4,7-dioxoindole (Example 68) in 3 ml. of pyridine is treated with 0.3 ml. of methyl chloroformate and kept at room temperature for 16.5 hours. Water is added, and the precipitated solid is collected by filtration and recrystallized from acetone-hexane to give orange needles, M.P. 137–138° C.

*Example 200.—Preparation of 1-ethyl-3-hydroxymethyl-5-methoxy-2,6-dimethyl-4,7-dioxoindole ethyl carbonate*

In the manner described in Example 199 treatment of 1-ethyl - 3-hydroxymethyl - 5-methoxy - 2,6-dimethyl-4,7-dioxoindole (Example 68) with ethyl chloroformate in pyridine gives orange needles, M.P. 112–113° C.

*Example 201.—Preparation of 1-ethyl-3-hydroxymethyl-5-methoxy-2,6-dimethyl-4,7-dioxoindole phenylcarbonate*

To a magnetically-stirred ice-chilled solution of 958 mg. (3.64 mmoles) of 1-ethyl-3-hydroxymethyl-5-methoxy-2,6-dimethyl-4,7-dioxoindole (Example 68) in 10 ml. of pyridine is added dropwise 1 ml. of phenyl chloroformate. A gum separates and the mixture is stirred at room temperature for 3 hours. The resulting mixture is cautiously diluted with water and stirred at ice-bath temperature for 30 minutes. The mixture is filtered; and the residue is dissolved in methylene chloride, dried over magnesium sulfate and the solvent is evaporated. The residue is co-distilled with toluene to remove traces of pyridine and then crystallized from ether-petroleum ether (B.P. 30–60° C.) to give 965 mg. of light orange needles, M.P. 115–117° C.

*Example 202.—Preparation of 1-ethyl-3-hydroxymethyl-5-methoxy-6-methyl-4,7-dioxoindole phenylcarbonate*

To an ice-chilled, magnetically-stirred solution of 149 mg. of 1-ethyl-3-hydroxymethyl-5-methoxy-6-methyl-4,7-dioxoindole (Example 133) in 5 ml. of pyridine is added 0.5 ml. of phenyl chloroformate. Isolation of the product is accomplished in the manner described in Example 201. The product is obtained as an orange oil.

*Example 203. — Preparation of 1-ethyl-3-(α-hydroxyethyl)-5-methoxy-2,6-dimethyl-4,7-dioxoindole phenylcarbonate*

To a magnetically stirred ice-chilled solution of 100 mg. of crude 1-ethyl-3-(1'-hydroxyethyl)-5-methoxy-2,6-dimethyl-4,7-dioxoindole (Example 70) in 2 ml. of dry pyridine is added 0.1 ml. of phenyl chloroformate. A gum separates and this mixture is stirred at room temperature for 3 hours. Water is added and an oil separates. The water is decanted from the oil and the oil is distributed between methylene chloride and water. The extract is washed with saline solution, dried over anhydrous sodium sulfate and taken to dryness to give an orange oil.

*Example 204. — Preparation of 5-ethoxy-1-ethyl-3-hydroxymethyl-2,6-dimethyl-4,7-dioxoindole phenylcarbonate*

In the manner described in Example 201 treatment of 1-ethyl-3-hydroxymethyl-2,6-dimethyl-4,7-dioxoindole (Example 69) with phenyl chloroformate in pyridine gives orange crystals, M.P. 108–112° C.

*Example 205. — Preparation of 1-ethyl-5-methoxy-6-methyl - 4,7-dioxo - 3-phenoxycarbonyloxymethyl - 2-indolecarboxamide*

In the manner described in Example 201 treatment of 1-ethyl-3-hydroxymethyl-5-methoxy-6-methyl-4,7-dioxo-2-indolecarboxamide (Example 151) with phenyl chloroformate in pyridine gives yellow crystals, M.P. 174–176° C.

*Example 206.—Preparation of 1-ethyl-3-hydroxymethyl-5-methoxy-2,6-dimethyl-4,7-dioxoindole carbamate*

A solution of crude 1-ethyl-3-hydroxymethyl-5-methoxy-2,6-dimethyl-4,7-dioxoindole phenylcarbonate (Example 201) in 10 ml. of methylene chloride is chilled in an acetone-Dry Ice bath and ammonia is introduced until the volume is about 35 ml. The solution is then stirred at room temperature for 75 minutes; most of the ammonia evaporates during this time. A warm water-bath is placed under the solution. When most of the solvent has evaporated the residue is distributed between methylene chloride and water. The organic solution is washed successively with a sodium carbonate solution and water, dried over magnesium sulfate and taken to dryness. The residue crystallizes from methylene chloride-petroleum ether (B.P. 30–60° C.) to give orange crystals, M.P. 200–202° C.

*Example 207. — Preparation of 1-ethyl-3-(α-hydroxymethyl)-5-methoxy-2,6-dimethyl-4,7-dioxoindole carbamate*

A solution of crude 1-ethyl-3-(1'-hydroxyethyl)-5-methoxy - 2,6-dimethyl - 4,7-dioxoindole phenylcarbonate (Example 203) in 20 ml. of ether is chilled in an acetone-Dry Ice bath and ammonia is introduced until the volume is about 40 ml. The acetone-Dry Ice bath is removed and the reaction mixture is allowed to stand at room temperature under a Dry Ice condenser for 4 hours. The Dry Ice condenser is removed and a warm water-bath is placed under the solution. When most of the solvent has evaporated, the residue is distributed between ether and water. The organic solution is washed with saline, dried over anhydrous sodium sulfate and taken to dryness to give an orange oil. This material is subjected to chromatography on diatomaceous earth using an n-heptane:ethyl acetate: methanol:water (70:30:17:4) system. Removal of the solvent from hold back volume 3.7–4.7 gives an orange oil.

*Example 208.—Preparation of 1-ethyl-3-hydroxymethyl-5-methoxy-6-methyl-4,7-dioxoindole carbamate*

In the manner described in Example 206 a solution of 1-ethyl-3-hydroxymethyl-5-methoxy-6-methyl-4,7-dioxoindole phenylcarbonate (Example 202) in methylene chloride is treated with ammonia. The product crystallizes from methylene chloride-petroleum ether (B.P. 30–60° C.) as orange blades, M.P. 165–166° C.

*Example 209. — Preparation of 5-ethoxy-1-ethyl-3-hydroxymethyl-2,6-dimethyl-4,7-dioxoindole carbamate*

In the manner described in Example 206 treatment of 5-ethoxy-1-ethyl-3-hydroxymethyl-2,6-dimethyl-4,7-dioxoindole phenylcarbonate (Example 204) with ammonia in methylene chloride gives an orange solid.

*Example 210.—Preparation of 1-ethyl-3-hydroxymethyl-5-methoxy - 6-methyl - 4,7-dioxo-2-indolecarboxamide carbamate*

In the manner described in Example 206 treatment of 1-ethyl - 5-methoxy-6-methyl-4,7-dioxo-3-phenoxycarbonyloxymethyl-2-carboxamide (Example 205) with ammonia produces yellow crystals, M.P. 247–248° C.

*Example 211.—Preparation of 1-ethyl-3-hydroxymethyl-5-methoxy-2,6-dimethyl-4,7-dioxoindole diphenylcarbamate*

A solution of 200 mg. of 1-ethyl-3-hydroxymethyl-5-methoxy-2,6-dimethyl-4,7-dioxoindole (Example 68) in 4 ml. of pyridine is treated with 180 mg. of diphenylcarbamyl chloride and heated on the steam bath overnight. Water is added and the resulting oil is extracted with methylene chloride. The extract is washed with saline solution, dried over sodium sulfate and concentrated to dryness in vacuo to give an intractable oil. The residue is dissolved on a minimum amount of benzene and placed on a magnesia-silica gel column, ether being used as a wash solvent. The solvent is removed and the residue is crystallized from ether-petroleum ether (B.P. 30–60° C.) to give 57 mg. of orange crystals, M.P. 159–161° C.

*Example 212.—Preparation of 1-ethyl-3-hydroxymethyl-5-methoxy-2,6-dimethyl-4,7-dioxoindole dimethylcarbamate*

In the manner described in Example 206 treatment of 200 mg. of 1-ethyl - 3 - hydroxymethyl-5-methoxy-2,6-dimethyl-4,7-dioxoindole phenylcarbonate (Example 201) in methylene chloride with dimethylamine produces red-orange needles, M.P. 119–120° C. after recrystallization from methylene chloride-petroleum ether (B.P. 30–60° C.).

*Example 213.—Preparation of 1-ethyl-3-hydroxymethyl-5-methoxy - 2,6 - dimethyl-4,7-dioxoindole phenylcarbamate*

A solution of 100 mg. of 1-ethyl-3-hydroxymethyl-5-methoxy-2,6-dimethyl-4,7-dioxoindole (Example 68) in 0.4 ml. of phenyl isocyanate is heated on the steam bath for 3 hours. The cooled solution is diluted to a volume of 10 ml. with petroleum ether (B.P. 30–60° C.), and the supernatant liquid is decanted from the precipitated solid. Recrystallization of the residue from methylene chloride-petroleum ether (B.P. 30–60° C.) gives orange crystals, M.P. 156–158° C.

*Example 214.—Preparation of 1-ethyl-3-hydroxymethyl-5-methoxy - 2,6 - dimethyl-4,7-dioxoindole amylcarbamate*

In the manner described in Example 213 treatment of 1-ethyl-3-hydroxymethyl - 5 - methoxy-2,6-dimethyl-4,7-dioxoindole (Example 68) with amyl isocyanate gives yellow needles, M.P. 124–125° C.

*Example 215.—Preparation of 1-ethyl-3-hydroxymethyl-2,6-dimethyl - 5 - methylamino-4,7-dioxoindole carbamate*

A solution of 175 mg. of 1-ethyl-3-hydroxymethyl-2,6-dimethyl-5-methoxy-4,7-dioxoindole carbamate (Example 206) in 5 ml. of methylene chloride is cooled in a Dry Ice-acetone bath and treated with methylamine, bubbled into it, for 10 minutes. After warming to room temperature for 2 hours, the mixture is concentrated and the residue is dissolved in 400 ml. of warm methylene chloride. This solution is washed with water, dried and concentrated on a steam bath until crystals begin to form. Cooling affords purple needles, M.P. 237–240° C.

*Example 216.—Preparation of 1-ethyl-3-hydroxymethyl-5-methylamino - 2,6 - dimethyl-4,7-dioxoindole methylcarbamate*

A solution of 285 mg. of 1-ethyl-3-hydroxymethyl-5-methoxy-2,6-dimethyl - 4,7 - dioxoindole phenylcarbonate (Example 201) in 20 ml. of methylene chloride is chilled in an acetone-Dry Ice bath and methylamine is bubbled into the solution for 20 minutes. The orange solution turns a dark red and then to a deep purple. The solution is stirred at room temperature for one hour. A warm water-bath is placed under the solution. When most of the solvent has evaporated, the residue is distributed between methylene chloride and water. The organic solution is washed with water, dried over anhydrous sodium sulfate and taken to dryness. The residue is crystallized from methylene chloride-petroleum ether (B.P. 30–60° C.) to give purple crystals, M.P. 213–215° C.

*Example 217.—Preparation of 1-ethyl-3-hydroxymethyl-5-hydroxy-2,6-dimethyl - 4,7 - dioxoindole methylcarbamate*

A suspension of 62 mg. of 1-ethyl-3-hydroxymethyl-5-methylamino - 2,6 - dimethyl-4,7-dioxoindole methylcarbamate (Example 216) in 12 ml. of 0.1 N hydrochloric acid is shaken at room temperature for 5 hours. The reaction mixture is filtered and solution is extracted with methylene chloride. The organic solution is washed with water, dried over anhydrous sodium sulfate and taken to dryness. The residue is crystallized from methylene chloride-petroleum ether (30–60° C.) to give a pink solid, M.P. 190–192° C.

*Example 218.—Preparation of 1-ethyl-3-hydroxymethyl-5-methoxy - 2,6 - dimethyl-4,7-dioxoindole methylcarbamate*

A magnetically stirred mixture of 18 mg. of 1-ethyl-3-hydroxymethyl - 5 - hydroxy-2,6-dimethyl-4,7-dioxoindole methyl carbamate (Example 217) 180 mg. of potassium carbonate and 0.5 ml. of dimethylsulfate in 10 ml. of acetone is heated at reflux temperature for 45 minutes and then stirred at room temperature for 2 hours. The mixture is filtered and the residue washed well with acetone. The combined filtrate and washings are concentrated, the excess alkylating agent being removed on the steam-bath at reduced pressure. The residue is crystallized from methylene chloride-petroleum ether (30–60° C.) to give 11 mg. of orange crystals, M.P. 168–170° C.

*Example 219.—Preparation of 1-ethyl-3-hydroxymethyl-5-methoxy-2,6-dimethyl - 4,7 - dioxoindole diethylcarbamate*

In the manner described in Example 206 treatment of a solution of 1-ethyl-3-hydroxymethyl-5-methoxy-2,6-dimethyl-4,7-dioxoindole penylcarbonate (Example 201) in methylene chloride with diethylamine produces red-orange crystals, M.P. 103–106° C.

*Example 220.—Preparation of 1-ethyl-3-hydroxymethyl-5-methoxy-2,6-dimethyl - 4,7 - dioxoindole N-(3-dimethylaminopropyl)-N-methylcarbamate*

In the manner described in Example 206 treatment of a solution of 1-ethyl-3-hydroxyethyl-5-methoxy-2,6-dimethyl-4,7-dioxoindole phenylcarbonate (Example 201) in methylene chloride with N,N,N'-trimethyltrimethylenediamine gives red-orange crystals, M.P. 60–61° C.

*Example 221.*—*Preparation of 1-ethyl-3-hydroxymethyl-5-methoxy-2,6-dimethyl - 4,7 - dioxoindole allylcarbamate*

In the manner described in Example 213 treatment of 1-ethyl-3-hydroxymethyl - 5 - methoxy-2,6-dimethyl-4,7-dioxoindole (Example 68) with allyl isocyanate gives orange crystals, M.P. 121–122° C.

*Example 222.*—*Preparation of 1 - ethyl - 3 - hydroxymethyl - 5 - methoxy - 2,6 - dimethyl - 4,7 - dioxoindole methylcarbamate*

In the manner described in Example 213 treatment of 1 - ethyl - 3 - hydroxymethyl - 5 - methoxy - 2,6 - dimethyl-4,7-dioxoindole (Example 68) with methyl isocyanate gives orange crystals, M.P. 168–170° C.

*Examples 223–236*

In the manner described in Example 222 the compounds of Table XV are prepared.

TABLE XV

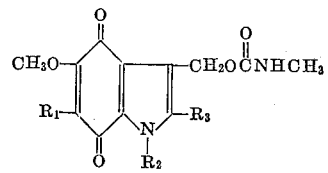

| Example No. | Starting Material | Product | | | M.p., ° C. |
|---|---|---|---|---|---|
| | | $R_1$ | $R_2$ | $R_3$ | |
| 223 | Product of Example 137 | $CH_3$ | $CH_3$ | $CH_3$ | 209–210 |
| 224 | Product of Example 138 | $CH_3$ | $C_3H_7$ | $CH_3$ | 170.0–172.0 |
| 225 | Product of Example 139 | $CH_3$ | $CH(CH_3)_2$ | $CH_3$ | 172.0–173.5 |
| 226 | Product of Example 140 | $CH_3$ | $C_4H_9$ | $CH_3$ | 127–129 |
| 227 | Product of Example 141 | $CH_3$ | $C_2H_5$ | $C_2H_5$ | 157–159 |
| 228 | Product of Example 142 | $C_2H_5$ | $C_2H_5$ | $CH_3$ | 142–145 |
| 229 | Product of Example 143 | $CH_3$ | $C_2H_5$ | $CH_2O$—⟨tetrahydropyranyl⟩ | 119–121 |
| 230 | Product of Example 144 | $CH_3$ | $CH_2CH_2F$ | $CH_3$ | 162–163 |
| 231 | Product of Example 145 | $CH_3$ | $CH_2CH_2N_3$ | $CH_3$ | 139–140 |
| 232 | Product of Example 146 | $CH_3$ | $CH_2CH_2SH$ | $CH_3$ | 112–115 |
| 233 | Product of Example 147 | $CH_3$ | $CH_2CH_2Cl$ | $CH_3$ | 157.5–159.5 |
| 234 | Product of Example 148 | $CH_3$ | $CH_2CH_2SCH_3$ | $CH_3$ | 151–152 |
| 235 | Product of Example 149 | $CH_3$ | $CH_2CH_2O$—⟨tetrahydropyranyl⟩ | $CH_3$ | 133.5–135.0 |
| 236 | Product of Example 150 | $CH_3$ | $C_2H_5$ | $COOCH_3$ | 175–176 |

*Example 237.*—*Preparation of 3 - hydroxymethyl - 5 - methoxy - 2,6 - dimethyl - 4,7 - dioxoindole 3 - propylcarbamate*

In the manner described in Example 213 treatment of 3 - hydroxymethyl - 5 - methoxy - 2,6 - dimethyl - 4,7-dioxoindole (Example 136) with propyl isocyanate produces red crystals, M.P. >275° C.

*Examples 238–249*

By the procedure of Example 213 the compounds of Table XVI are obtained.

TABLE XVI

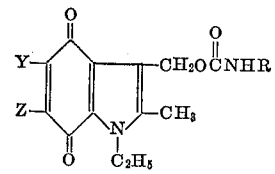

| Example No. | Y | Z | R | Starting Compound | Reagent | M.p., ° C. |
|---|---|---|---|---|---|---|
| 238 | $CH_3S$ | $CH_3$ | $CH_3$ | Product of Example 190 | $CH_3NCO$ | 184–185 |
| 239 | $Cl$ | $CH_3$ | $CH_3$ | Product of Example 188 | $CH_3NCO$ | 182–183 |
| 240 | $CH_3O$ | $Br$ | $C_3H_7$ | Product of Example 197 | $C_3H_7NCO$ | 144–146 |
| 241 | $Br$ | $Br$ | $C_3H_7$ | Product of Example 192 | $C_3H_7NCO$ | 187–191 |
| 242 | $CH_3O$ | $H$ | $C_3H_7$ | Product of Example 195 | $C_3H_7NCO$ | 144–146 |
| 243 | $Br$ | $CH_3O$ | $C_3H_7$ | Product of Example 198 | $C_3H_7NCO$ | 162.5–164 |
| 244 | $H$ | $CH_3O$ | $C_3H_7$ | Product of Example 196 | $C_3H_7NCO$ | 136–138 |
| 245 | $C_6H_{13}O$ | $CH_3$ | $CH_3$ | Product of Example 189 | $CH_3NCO$ | 95.5–96.5 |
| 246 | $C_2H_5O$ | $CH_3$ | $CH_3$ | Product of Example 69 | $CH_3NCO$ | 156–158 |
| 247 | $CH_3$ | $CH_3$ | $CH_3$ | Product of Example 194 | $CH_3NCO$ | 175–178 |
| 248 | $H$ | $CH_3$ | $CH_3$ | Product of Example 193 | $CH_3NCO$ | 133–137 |
| 249 | $H$ | $H$ | $C_3H_7$ | Product of Example 191 | $C_3H_7NCO$ | |

*Example 250.—Preparation of 1 - ethyl - 3 - hydroxymethyl - 5 - methoxy - 2,6 - dimethyl - 4,7 - dioxoindole isopropylcarbamate*

In the manner described in Example 213 treatment of 1 - ethyl - 3 - hydroxymethyl - 5 - methoxy - 2,6 - dimethyl-4,7-dioxoindole (Example 68) with isopropyl isocyanate gives red-orange crystals, M.P. 151–153° C.

*Example 251.—Preparation of 1 - ethyl - 3 - hydroxymethyl - 5 - methoxy - 2,6 - dimethyl - 4,7 - dioxoindole ethylcarbamate*

In the manner described in Example 213 treatment of 1 - ethyl - 3 - hydroxymethyl - 5 - methoxy - 2,6 - dimethyl-4,7-dioxoindole (Example 68) with ethyl isocyanate gives orange crystals, M.P. 159–160° C.

*Example 252.—Preparation of 1 - ethyl - 3 - hydroxymethyl - 5 - methoxy - 2,6 - dimethyl - 4,7 - dioxoindole propylcarbamate*

In the manner described in Example 213 treatment of 1 - ethyl - 3 - hydroxymethyl - 5 - methoxy - 2,6 - dimethyl - 4,7 - dioxoindole (Example 68) with butyl isocyanate gives orange crystals, M.P. 129–130° C.

*Example 253.—Preparation of 1 - ethyl - 3 - hydroxymethyl - 5 - methoxy - 2,6 - dimethyl - 4,7 - dioxoindole butylcarbamate*

In the manner described in Example 213 treatment of 1 - ethyl - 3 - hydroxymethyl - 5 - methoxy - 2,6 - dimethyl - 4,7 - dioxoindole (Example 68) with butyl isocyanate gives orange crystals, M.P. 116–117° C.

*Example 254.—Preparation of 1 - ethyl - 3 - hydroxymethyl - 5 - methoxy - 2,6 - dimethyl - 4,7 - dioxoindole bis-(carbethoxymethyl)carbamate*

In the manner described in Example 213 treatment of 1 - ethyl - 3 - hydroxymethyl - 5 - methoxy - 2,6 - dimethyl-4,7-dioxoindole (Example 68) with ethyl isocyanatoacetate gives light orange needles, M.P. 151–154° C.

*Example 255.—Preparation of 1 - ethyl - 3 - hydroxymethyl - 5 - methoxy - 2,6 - dimethyl - 4,7 - dioxoindole m - chlorophenylcarbamate*

In the manner described in Example 213 treatment of 1 - ethyl - 3 - hydroxymethyl - 5 - methoxy - 2,6 - dimethyl-4,7-dioxoindole (Example 68) with m-chlorophenyl isocyanate gives red-orange crystals, M. P. 148–149° C.

*Example 256.—Preparation of 1-ethyl-3-hydroxymethyl-5 - methoxy - 2,6-dimethyl-4,7-dioxoindole o-methoxyphenylcarbamate*

In the manner described in Example 213 treatment of 1 - ethyl - 3 - hydroxymethyl - 5 - methoxy - 2,6 - dimethyl-4,7-dioxoindole (Example 68) with o-methoxyphenyl isocyanate gives orange crystals, M.P. 170–171° C.

*Example 257.—Preparation of 1 - ethyl - 3 - hydroxymethyl - 5 - methoxy - 2,6 - dimethyl - 4,7 - dioxoindole α-naphthylcarbamate*

In the manner described in Example 213 treatment of 1 - ethyl - 3 - hydroxymethyl - 5 - methoxy - 2,6 - dimethyl-4,7-dioxoindole (Example 68) with α-naphthyl isocyanate gives orange crystals, M.P. 169–170° C.

*Example 258.—Prepration of 1 - ethyl - 3 - hydroxymethyl - 5 - methoxy - 2,6 - dimethyl - 4,7 - dioxoindole p-fluorophenylcarbamate*

In the manner described in Example 213 treatment of 1 - ethyl - 3 - hydroxymethyl - 5 - methoxy - 2,6 - dimethyl-4,7-dioxoindole (Example 68) with p-fluorophenylisocyanate gives orange crystals, M.P. 140–146° C.

*Example 259.—Preparation of 1 - ethyl - 3 - hydroxymethyl - 5 - methoxy - 2,6 - dimethyl - 4,7 - dioxoindole benzylcarbamate*

In the manner described in Example 206 a solution of 1 - ethyl - 3 - hydroxymethyl - 5 - methoxy - 2,6 - dimethyl-4,7-dioxoindole phenylcarbonate (Example 201) in methylene chloride is treated with benzylamine to give brownish red plates, M.P. 117.0–117.5° C.

*Example 260.—Preparation of 1 - ethyl - 3 - hydroxymethyl - 5 - methoxy - 2,6 - dimethyl - 4,7 - dioxoindole N,N-pentamethylenecarbamate*

In the manner described in Example 206 treatment of a methylene chloride solution of 1-ethyl-3-hydroxymethyl-5-methoxy-2,6-dimethyl-4,7-dioxoindole phenylcarbonate (Example 201) with piperidine gives red needles, M.P. 163–164° C.

*Example 261.—Preparation of 1 - ethyl - 3 - hydroxymethyl - 5 - methoxy - 2,6 - dimethyl - 4,7 - dioxoindole 4-methylpiperazine-1-charboxylate*

In the manner described in Example 206 treatment of 1 - ethyl - 3 - hydroxymethyl - 5 - methoxy - 2,6 - dimethyl-4,7-dioxoindole phenylcarbonate (Example 202) with N-methylpiperazine in methylene chloride produces red needles, M.P. 134–136° C.

*Example 262.—Preparation of - 1- ethyl - 3 - hydroxymethyl - 5 - methoxy - 2,6 - dimethyl - 4,7 - dioxoindole N,N-ethylenecarbamate*

In the manner described in Example 206 treatment of 1 - ethyl - 3 - hydroxymethyl - 5 - methoxy - 2,6 - dimethyl-4,7-dioxoindole phenylcarbonate (Example 201) with ethyleneimine in methylene chloride gives red-orange crystals, M.P. 123–125° C.

*Example 263.—Preparation of 1 - ethyl - 3 - hydroxymethyl - 5 - methoxy - 2,6 - dimethyl - 4,7 - dioxoindole m-tolycarbamate*

In the manner described in Example 213 treatment of 1 - ethyl - 3 - hydroxymethyl - 5 - methoxy - 2,6 - dimethyl-4,7-dioxoindole (Example 68 ) with m-tolyl isocyanate gives orange crystals, M.P. 141–144° C.

*Example 264.—Preparation of 1 - ethyl - 3 - hydroxymethyl - 5 - methoxy - 2,6 - dimethyl - 4,7-dioxoindole β-naphthylcarbamate*

In the manner described in Example 213 treatment of 1 - ethyl - 3 - hydroxymethyl - 5 - methoxy - 2,6 - dimethyl-4,7-dioxoindole (Example 68) with β-naphthyl isocyanate gives orange crystals, M.P. 209–210° C.

*Example 265.—Preparation of 1 - ethyl - 3 - hydroxymethyl - 5 - methoxy - 2,6 - dimethyl - 4,7 - dioxoindole dipropylcarbamate*

In the manner described in Example 206 treatment of a solution of 1 - ethyl - 3 - hydroxymethyl - 5 - methoxy-2,6-dimethyl-4,7-dioxoindole phenylcarbonate (Example 201) in methylene chloride with di-n-propylamine is productive of this ester.

*Example 266.—Preparation of 1 - ethyl - 3 - hydroxymethyl - 5 - methoxy - 2,6 - dimethyl - 4,7 - dioxoindole 2-hydroxyethylcarbamate*

In the manner described in Example 206 treatment of a solution 1 - ethyl - 3 -hydroxymethyl - 5 - methoxy-2,6-dimethyl-4,7-dioxoindole phenylcarbonate (Example 201) in methylene chloride with β-aminoethanol is productive of this ester.

*Example 267.—Preparation of 1 - ethyl - 3 - hydroxymethyl - 5 - methoxy - 2,6 - dimethyl - 4,7 - dioxoindole cyclohexylcarbamate*

In the manner described in Example 213 treatment of 1 - ethyl - 3 - hydroxymethyl - 5 - methoxy - 2,6 - dimethyl-4,7-dioxoindole (Example 68) with cyclohexyl isocyanate gives orange crystals, M.P. 159–160° C.

*Example 268.—Preparation of 1 - ethyl - 3 - hydroxymethyl - 5 - methoxy - 2,6 - dimethyl - 4,7 - dioxoindole 2-cyanoethylcarbamate*

In the manner described in Example 206 treatment of 1 - ethyl - 3 - hydroxymethyl - 5 - methoxy - 2,6 - dimethyl-4,7-dioxoindole phenylcarbonate (Example 201) in methylene chloride with β-aminopropionitrile gives orange crystals, M.P. 147–149° C.

*Examples 269.—Preparation of 1 - ethyl - 3 - hydroxymethyl - 5 - methoxy - 2,6 - dimethyl - 4,7 - dioxoindole 3-hydroxypropylcarbamate*

In the manner described in Example 206 treatment of 1 - ethyl - 3 -hydroxymethy - 5 - methoxy - 2,6 - dimethyl-4,7-dioxoindole (Example 201) in methylene chloride with 3-hydroxypropylamine gives orange crystals, M.P. 125–126° C.

*Example 270.—Preparation of 1 - ethyl - 3 - hydroxymethyl - 5 - methoxy - 2,6 - dimethyl - 4,7 - dioxoindole 3-methylmercaptopropylcarbamate*

In the manner described in Example 206 treatment of 1 - ethyl - 3 - hydroxymethyl - 5 - methoxy - 2,6 - dimethyl-4,7-dioxoindole phenylcarbonate (Example 201) in methylene chloride with 3-methylmercaptopropylamine gives orange crystals, M.P. 116–118° C.

*Example 271.—Preparation of 1 - ethyl - 3 - hydroxymethyl - 5 - methoxy - 2,6 - dimethyl - 4,7 - dioxoindole ethoxyethylcarbamate*

In the manner described in Example 206 treatment of 1 - ethyl - 3 - hydroxymethyl - 5 - methoxy - 2,6 - dimethyl-4,7-dioxoindole phenylcarbonate (Example 201) in methylene chloride with ethoxyethylamine gives orange crystals, M.P. 109–110° C.

*Example 272.—Preparation of 1 - ethyl - 3 - hydrazinocarbonyloxymethyl - 5 - methoxy - 2,6 - dimethyl- 4,7-dioxoindole*

In the manner described in Example 206 treatment of 1 - ethyl - 3 - hydroxymethyl - 5 - methoxy - 2,6 - dimethyl-4,7-dioxoindole phenylcarbonate (Example 201) with hydrazine hydrate gives orange material.

*Example 273.—Preparation of 1-ethyl-3-hydroxymethyl- 5 - methoxy - 2,6 - dimethyl - 4,7 - dioxoindole 4 - morpholinecarboxylate*

In the manner described in Example 206 treatment of 1 - ethyl - 3 - hydroxymethyl - 5 - methoxy - 2,6 - dimethyl-4,7-dioxoindole phenylcarbonate (Example 201) with morpholine gives orange material.

*Example 274.—Preparation of 1-ethyl-3-hydroxymethyl- 5 - methoxy - 2,6 - dimethyl - 4,7 - dioxoindole 4 - (3-hydroxypropyl)piperazine-1-carboxylate*

In the manner described in Example 206 treatment of 1 - ethyl - 3 - hydroxymethyl - 5 - methoxy - 2,6 - dimethyl-4,7-dioxoindole phenylcarbonate (Example 201) with 1-(3-hydroxypropyl)-piperazine gives orange material.

*Example 275.—Preparation of 1-ethyl-3-hydroxymethyl- 5 - methoxy - 2,6 - dimethyl - 4,7 - dioxoindole 4 - (3-dimethylaminopropyl)piperazine-1-carboxylate*

In the manner described in Example 206 treatment of 1 - ethyl - 3 - hydroxymethyl - 5 - methoxy - 2,6 - dimethyl-4,7-dioxoindole phenylcarbonate (Example 201) with 1-(3-dimethylaminopropyl)piperazine gives orange crystals, M.P. 126–128° C.

*Example 276.—Preparation of 1-ethyl-5-ethylamino-3-hydroxymethyl - 2,6-dimethyl - 4,7 - dioxoindole methylcarbamate*

A solution of 100 mg. of 1-ethyl-3-hydroxymethyl-5-methoxy - 2,6 - dimethyl - 4,7 - dioxoindole methylcarbamate (Example 222) in 15 ml. of methanol is treated with excess ethylamine. The resulting solution is kept at room temperature until it has turned purple. It is then concentrated under reduced pressure and the residue is recrystallized from methylene chloride hexane. In this manner 76 mg. of purple needles, M.P. 144–148° C. is obtained.

*Examples 277–288*

By the procedure of Example 276 the compounds of Table XVII are obtained.

TABLE XVII

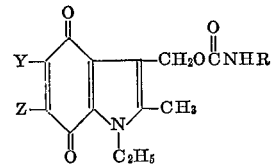

| Example No. | Y | Z | R | Starting Compound | Reagent | M.P., °C. |
|---|---|---|---|---|---|---|
| 277 | ⟩N | CH₃ | CH₃ | Product of Example 222 | ⟩NH | 168–169 |
| 278 | (CH₃)₂N | CH₃ | CH₃ | Product of Example 222 | (CH₃)₂NH | ¹ 192–194 |
| 279 | HOCH₂CH₂NH | CH₃ | CH₃ | Product of Example 222 | HOCH₂CH₂NH₂ | 158–160 |
| 280 | H₂N | Br | C₃H₇ | Product of Example 240 | NH₃ | 136–142 |
| 281 | C₂H₅–NCH₂CH₂NH–C₂H₅ | CH₃ | CH₃ | Product of Example 222 | C₂H₅–NCH₂CH₂NH₂–C₂H₅ | 149–150 |
| 282 | Br | CH₃NH | C₃H₇ | Product of Example 243 | CH₃NH₂ | 168–169 |
| 283 | Br | NH₂ | C₃H₇ | Product of Example 243 | NH₃ | ¹ 178 |
| 284 | C₆H₅CH₆NH | CH₃ | CH₃ | Product of Example 222 | C₆H₅CH₆NH₂ | 170–171 |
| 285 | H₂N | CH₃ | H | Product of Example 206 | NH₃ | ¹ 195–205 |
| 286 | ⟨⟩–NH | CH₃ | CH₃ | Product of Example 222 | ⟨⟩–NH₂ | 115–117 |
| 287 | H₂N | CH₃ | CH₃ | Product of Example 222 | NH₃ | ¹ 170 |
| 288 | CH₃NH | CH₃ | H | Product of Example 206 | CH₃NH₂ | 237–240 |

¹ Dec.

*Example 289.—Preparation of 1-ethyl-5-hydroxy-3-hydroxymethyl - 2,6-dimethyl - 4,7 - dioxoindole methylcarbamate*

A suspension of 425 mg. of 5-diethylaminoethylamino-1 - ethyl - 3 - hydroxymethyl - 2,6 - dimethyl - 4,7 - dioxoindole methylcarbamate (Example 281) in 160 ml. of water is treated with 12 drops of 3 N hydrochloric acid. After 2 hours the resulting mixture is made alkaline with sodium carbonate solution and extracted with methylene chloride. The aqueous layer is carefully acidified with hydrochloric acid and extracted with methylene chloride. This extract is dried and concentrated on a steam bath as hexane is added. Cooling when the first crystals appear affords 160 mg. of orange crystals, M.P. 170–180° C. Recrystallization from methanol gives orange prisms, M.P. 178–181° C. dec.

*Example 290.—Preparation of 5-diethylmethylammoniumethylamino - 1 - ethyl - 3 - hydroxymethyl - 2,6-dimethyl-4,7-dioxoindole methylcarbamate*

A mixture of 160 mg. of 5-diethylaminoethylamino-1-ethyl - 3 - hydroxymethyl - 2,6 - dimethyl - 4,7 - dioxoindole methylcarbamate (Example 281) and 4 ml. of methyl iodide is kept at room temperature for 3 days. The excess methyl iodide is evaporated and the residual solid is crystallized from methylene chloride-hexane to afford 171 mg. of purple granules, dec. 103° C.

*Example 291.—Preparation of 1-ethyl-2,3-bis-hydroxymethyl - 5 - methoxy - 6 - methyl - 4,7 - dioxoindole 3-methylcarbamate*

A solution of 716 mg. of 1-ethyl-3-hydroxymethyl-5-methoxy - 6 - methyl - 4,7 - dioxo - 2 - tetrahydropyranyloxymethylmethylindole methylcarbamate (Example 229) and 30 ml. of 0.1 N hydrochloric acid solution in 120 ml. of methanol is allowed to stand at room temperature for 18 hours. The solution is distributed between methylene chloride and water; the organic layer is washed with saline, dried over magnesium sulfate and evaporated. The residue crystallizes from methylene chloride-petroleum ether (B.P. 30–60° C.) to give yellow crystals, M.P. 164–166° C.

*Example 292.—Preparation of 1 - hydroxyethyl - 3 - hydroxymethyl - 5 - methoxy - 2,6 - dimethyl - 4,7 - dioxoindole 3-methylcarbamate*

In the manner described in Example 289 treatment of 300 mg. of 3-hydroxymethyl-5-methoxy-2,6-dimethyl-4,7 - dioxo - 1 - (β - tetrahydropyranyloxyethyl)indole methylcarbamate (Example 235) gives orange plates, M.P. 153–154° C.

*Example 293.—Preparation of 1-ethyl-2-formyl-3-hydroxymethyl - 5 - methoxy - 6 - methyl - 4,7 - dioxoindole 3-methylcarbamate*

A mixture of 50 mg. of 1-ethyl-2,3-bis-hydroxymethyl-5 - methoxy - 6 - methyl - 4,7 - dioxoindole 3 - methylcarbamate (Example 291) and 300 mg. of activated manganese dioxide in 125 ml. of ether is magnetically stirred at room temperature for 24 hours. The mixture is filtered through diatomaceous earth, and the filter cake is washed well with ether. The combined filtrate and washings are evaporated, and the residue crystallizes from ether-petroleum ether (B.P. 30–60° C.) as yellow needles, M.P. 147.0–148.5° C.

*Example 294.—Preparation of 1-ethyl-2-formyl-3 - hydroxymethyl-5-methoxy-6-methyl - 4,7 - dioxoindole methylcarbamate 2-methoxyoxime*

To a magnetically stirred solution of 50 mg. of 1-ethyl - 2 - formyl - 3 - hydroxymethyl - 5 - methoxy - 6-methyl-4,7-dioxoindole methylcarbamate (Example 293) in 5 ml. of ethanol is added 15.7 mg. of methoxyamine hydrochloride dissolved in water followed by 8.1 mg. of sodium carbonate dissolved in water. The reaction mixture is heated at reflux for 1 hour, whereafter it is cooled and diluted with water to give a reddish solid, M.P. 165–167° C.

*Example 295.—Preparation of 1-ethyl-2-formyl - 3 - hydroxymethyl-5-methoxy - 6 - methyl - 4,7 - dioxoindole methylcarbamate 1-oxime*

To a magnetically stirred solution of 200 mg. of 1-ethyl - 2 - formyl - 3 - hydroxymethyl - 5 - methoxy - 6-methyl-4,7-dioxoindole methylcarbamate (Example 293) in 20 ml. of ethanol is added 51.6 mg. of hydroxylamine hydrochloride dissolved in a small amount of water followed by 31.8 mg. of sodium carbonate dissolved in a small amount of water. The resulting solution is heated at reflux for 1 hour, whereafter it is cooled and diluted with water to give red crystals, M.P. 190–190.5° C.

*Example 296.—Preparation of 2 - cyano - 1 - ethyl - 3-hydroxymethyl - 5 - methoxy - 6 - methyl - 4,7-dioxoindole methylcarbamate*

A solution of 50 mg. of 1-ethyl-2-formyl-3-hydroxymethyl - 5 - methoxy - 6 - methyl - 4,7 - dioxoindole methylcarbamate 2-oxime (Example 295), 0.010 ml. of thionyl chloride and 0.018 ml. of dimethyl aniline in 5 ml. of benzene is intermittently heated on the steambath over a period of 0.5 hour. The solution is diluted with benzene and washed with saline solution, dried over magnesium sulfate and evaporated. The crude material is chromatographed on silica gel and the material eluted with ether is recrystallized from ether to give orange crystals, M.P. 146–148° C.

*Example 297.—Preparation of 2 - cyano - 1 - ethyl - 3-hydroxymethyl - 5 - methoxy - 6 - methyl-4,7-dioxoindole methylcarbamate*

A magnetically stirred solution of 100 mg. of 1-ethyl-2 - formyl - 3 - hydroxymethyl - 5 - methoxy - 6-methyl-4,7-dioxoindole methylcarbamate (Example 293), excess O,N-bis-trifluoroacetyl hydroxylamine, 0.09 ml. pyridine in 10 ml. of benzene is heated at reflux for 18 hours. The cooled solution is diluted with benzene and washed with water and saline. The organic phase is dried over magnesium sulfate and evaporated. The residue is crystallized from ether-petroleum ether (B.P. 30–60° C.) to give orange crystals, M.P. 148–149° C.

*Example 298.—Preparation of 1 - ethyl - 2 - formyl - 3-hydroxymethyl - 5 - methoxy - 6 - methyl-4,7-dioxoindole methylcarbamate 2-semicarbazone*

To a magnetically stirred suspension of 50 mg. of 1-ethyl - 2 - formyl - 3 - hydroxymethyl - 5 - methoxy - 6-methyl - 4,7 - dioxoindole - 3 - methylcarbamate (Example 293) is added 182 mg. of semicarbazide hydrochloride dissolved in water and 328 mg. of sodium acetate dissolved in water. The reaction mixture is heated on the steam-bath for 10 minutes after which solution occurs and reaction solution turns dark red. Water is added and the red solid is collected by filtration. Recrystallization from methanol-water gives red crystals, M.P. 212–214° C.

*Example 299.—Preparation of 2-acetoxymethyl-1-ethyl-3 - hydroxymethyl - 5 - methoxy - 2,6 - dimethyl - 4,7-dioxoindole methylcarbamate*

A solution of 92 mg. of 1-ethyl-2,3-bis-hydroxymethyl-5 - methoxy - 2,6 - dimethyl - 4,7 - dioxoindole 3-methylcarbamate (Example 291) and 0.5 ml. of acetic anhydride in 5 ml. of pyridine is kept at room temperature for 18 hours. Water is added, and the solution is extracted with methylene chloride. The extract is washed with saline, dried over magnesium sulfate and evaporated. The residue is crystallized from ether-petroleum ether (B.P. 30–60° C.) to give yellow needles, M.P. 143–145° C.

*Example 300.—Preparation of 1-ethyl-2,3-bis-hydroxymethyl - 5 - methoxy - 6-methyl-4,7-dioxoindole-2,3-bis-methylcarbamate*

In the manner described in Example 213 treatment of 1 - ethyl - 2,3 - bis - hydroxymethyl - 5 - methoxy - 6-methyl - 4,7 - dioxoindole 3 - methylcarbamate (Example 291) with methyl isocyanate gives yellow crystals, M.P. 193–194° C.

*Example 301.—Preparation of 2-chloromethyl-1-ethyl-3 - hydroxymethyl-5-methoxy-6-methyl-4,7-dioxoindole methylcarbamate*

To a magnetically stirred suspension of 720 mg. of 1 - ethyl - 2,3 - bis - hydroxymethyl - 5 - methoxy - 6-methyl - 4,7 - dioxoindole 3 - methylcarbamate (Example 291) in 80 ml. of benzene is added 0.27 ml. of dimethylaniline and 0.152 ml. of thionyl chloride and heated in a water-bath for 40 minutes. The reaction mixture is diluted with benzene and washed with water and saline solution. The organic phase is dried over magnesium sulfate and concentrated. The residue is chromatographed on silica gel and the material eluted with ether is recrystallized from ether-petroleum ether (30–60° C.) to give yellow crystals, M.P. 143–144° C.

*Example 302.—Preparation of 2-acetylthiomethyl-1-ethyl-3 - hydroxymethyl-5-methoxy-6-methyl-4,7-dioxoindole methylcarbamate*

A solution of 50 mg. of 2-chloromethyl-1-ethyl-3-hydroxymethyl - 5 - methoxy - 6 - methyl - 4,7 - dioxoindole methylcarbamate (Example 301), and 16.1 mg. of potassium thiolacetate in 10 ml. of acetone is magnetically stirred at room temperature for 40 minutes. The solution is diluted with water and extracted with methylene chloride. The extracts are washed with water, dried over magnesium sulfate and evaporated. The residue crystallizes from methylene chloride-petroleum ether (30–60° C.) to give orange crystals, M.P. 143–144° C.

*Example 303.—Preparation of 2-methoxymethyl-1-ethyl-3 - hydroxymethyl-5-methoxy-6-methyl-4,7-dioxoindole methylcarbamate*

A solution of 2 - chloromethyl - 1 - ethyl - 3 - hydroxy - methyl - 5 - methoxy - 6 - methyl - 4,7-dioxoindole methylcarbamate (Example 301) in 30 ml. of 5% methanolic potassium hydroxide is magnetically stirred at room temperature for 10 minutes. The solution is diluted with water and extracted with methylene chloride. The extracts are washed with saline, dried over magnesium sulfate and evaporated. The residue crystallizes from methylene chloride-petroleum ether (30–60° C.) to give yellow-orange crystals, M.P. 165–166° C.

*Example 304.—Preparation of 2-fluoromethyl-1-ethyl-3-hydroxymethyl-5-methoxy - 6 - methyl-4,7-dioxoindole methylcarbamate*

Silver fluoride, 1.3 g., is placed in a thimble in a Soxhlet extractor and extracted for 1 hour with acetonitrile at reflux. To the extract is added 245 mg. of 2-chloromethyl-1-ethyl - 3 - hydroxymethyl - 5 - methoxy-6-methyl-4,7-dioxoindole methylcarbamate (Example 301) and reflux is continued for an additional 2 hours. The reaction mixture is filtered hot through diatomaceous earth and evaporated. The residue is distributed between methylene chloride and water. The organic layer is washed with saline, dried over magnesium sulfate and evaporated. The residue is chromatographed on silica gel and the material eluted with ether is recrystallized from ether-petroleum ether (30–60° C.) to give yellow crystals, M.P. 137–138° C.

*Example 305.—Preparation of 5-methoxy-2,6-dimethyl-3-(N - methylcarbamoyloxymethyl) - 4,7 - dioxo - 1 - indolylethyldimethylsulfonium iodide*

A solution of 50 mg. of 3-hydroxymethyl-5-methoxy-2,6 - dimethyl - 1 - (β-methylmercaptoethyl)-4,7-dioxoindole methylcarbamate (Example 234) in 5 ml. of methyl iodide is kept at room temperature for 6 days. Ether is added, and the solid is recrystallized from methanol-ether to give light orange crystals, M.P. 128.0–129.5° C. dec.

*Example 306.—Preparation of 2-aminomethyl-1-ethyl-3-hydroxymethyl - 5 - methoxy-6-methyl-4,7-dioxoindole methylcarbamate*

A solution of 500 mg. of 2-chloromethyl-1-ethyl-3- hydroxymethyl-5-methoxy-6-methyl-4,7-dioxoindole methylcarbamate (Example 301) in 200 ml. of tetrahydrofuran saturated with ammonia is kept stoppered at room temperature for 5 days. The solvent is removed and the residue is partitioned on diatomaceous earth. The orange band is concentrated and the residue is recrystallized from methylene chloride-petroleum ether (B.P. 30–60° C.) to give orange crystals, M.P. 129–130° C. (gas).

*Example 307.—Preparation of 1-ethyl-5-ethyleneimino-3-hydroxymethyl-2,6-dimethyl-4,7-dioxoindole carbamate*

In the manner described in Example 277 treatment of 1 - ethyl - 3 - hydroxymethyl-5-methoxy-2,6-dimethyl-4,7-dioxoindole carbamate (Example 206) with ethyleneimine gives magenta prisms, M.P. 230–235° C.

*Example 308.—Preparation of 1-ethyl-5-ethyleneimino-3-hydroxymethyl - 2,6-dimethyl-4,7-dioxoindole hydroxyethylcarbamate*

In the manner described in Example 277 treatment of 1 - ethyl - 3 - hydroxymethyl-5-methoxy-2,6-dimethyl-4,7-dioxoindole hydroxyethylcarbamate (Example 265) with ethyleneimine gives scarlet needles, M.P. 122–124° C.

What is claimed is:

1. A member of the class consisting of 3-(α-carbamoyloxy-lower alkyl)-4,7-indoloquinones of the formula:

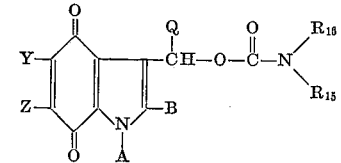

wherein A is selected from the group consisting of hydrogen, lower alkyl, ω-(halo)lower alkyl, ω-(lower alkylthio)lower alkyl, ω-(di-lower alkylsulfonium)lower alkyl halide, ω-(hydroxy)lower alkyl, ω-(tetrahydropyranyloxy)lower alkyl, ω-(azido)lower alkyl and ω-(mercapto)lower alkyl; B is selected from the group consisting of hydrogen, lower alkyl, halomethyl, aminomethyl, hydroxymethyl, lower alkoxymethyl, lower alkanoyloxymethyl, tetrahydropyranyloxymethyl, N-mono-(lower alkyl)carbamoyloxymethyl, lower alkanoylthiomethyl, lower alkoxycarbonyl, carboxamido, cyano, formyl, hydroxyiminomethyl, lower alkoxyiminomethyl, $N^4$-lower alkylsemicarbazanomethyl and semicarbazanomethyl; Q is selected from the group consisting of hydrogen and lower alkyl; Y is selected from the group consisting of hydrogen, hydroxy, lower alkoxy, halogen, lower alkyl, lower alkylthio, amino, mono(lower alkyl)amino, di(lower alkyl)amino, ω-(hydroxy)-lower alkylamino, ω-(di-lower alkylamino)mono(lower alkyl)amino, ω-(tri-lower alkylammonium)mono(lower alkyl)amino halide, lower cycloalkylamino, phenyl lower alkylamino and polymethyleneimino of from two to five carbon atoms; Z is selected from the group consisting of hydrogen, lower alkyl, bromine, lower alkoxy, amino and methylamino; $R_{15}$ is selected from the group consisting of hydrogen, lower alkyl and phenyl; $R_{16}$ is selected from the group consisting of hydrogen, lower alkyl, lower alkenyl, phenyl lower alkyl, phenyl, halo-substituted phenyl, lower alkoxy-substituted phenyl, naphthyl, ω-di(lower alkyl)aminoalkyl, lower cycloalkyl, ω-(cyano)lower alkyl, ω-(lower alkylthio)lower alkyl, ω-(lower alkoxy)lower alkyl, β-hydroxy)lower alkyl, γ-(hydroxy)lower alkyl and amino; and $R_{15}$ and $R_{16}$ taken together with N(itrogen) is selected from the group consisting of N-lower alkylpiperazino, N-(ω-hydroxy lower alkyl)piperazino, N-[(ω-di-lower alkylamino)lower alkyl]piperazino, morpholino, cyclopolymethyleneimino of from 2 to 5 carbon atoms and bis-lower carboalkoxymethyl.

2. 5-aziridino - 1 - ethyl - 3 - hydroxymethyl-2,6-dimethyl-4,7-dioxoindole carbamate.

3. 5-aziridino - 1 - ethyl - 3 - hydroxymethyl - 2,6 - dimethyl-4,7-dioxoindole β-hydroxyethyl carbamate.

4. 3-hydroxymethyl - 5 - methoxy-2,6-dimethyl-4,7-dioxoindole propylcarbamate.

5. 5-aziridino - 3 - hydroxymethyl-1,2,6-trimethyl-4,7-dioxoindole methylcarbamate.

6. 1-ethyl - 3 - hydroxymethyl-5,6-dimethoxy-2-methyl-4,7-dioxoindole methylcarbamate.

7. 1-ethyl - 3 - hydroxymethyl - 5 - methoxy-6-methyl-4,7-dioxoindole methylcarbamate.

8. 2-[$N^4$ - methylsemicarbazano]methyl - 4,7 - dioxoindole methylcarbamate.

9. 1-ethyl-3-hydroxymethyl - 5 - methoxy-2,6-dimethyl-4,7-dioxoindole carbamate.

10. 1-ethyl - 3 - hydroxymethyl - 5 - methoxy - 2,6-dimethyl-4,7-dioxoindole methylcarbamate.

11. 1-ethyl - 3 - hydroxymethyl - 5 - methoxy - 2,6-dimethyl-4,7-dioxoindole dimethylcarbamate.

12. 1-ethyl - 3 - hydroxymethyl - 5 - methoxy - 2,6-dimethyl-4,7-dioxoindole β-hydroxyethyl carbamate.

13. 1-ethyl - 3 - hydroxymethyl - 5 - methoxy-2,6-dimethyl-4,7-dioxoindole γ-hydroxypropyl carbamate.

14. 1-ethyl - 3 - hydroxymethyl - 5 - methoxy-2,6-dimethyl-4,7-dioxoindole β-cyanoethyl carbamate.

15. 1-methyl - 3 - hydroxymethyl - 5 - methoxy-2,6-dimethyl-4,7-dioxoindole methylcarbamate.

16. 1-iso-propyl - 3 - hydroxymethyl - 5 - methoxy-2,6-dimethyl-4,7-dioxoindole methylcarbamate.

17. 1-ethyl-3-hydroxymethyl - 5 - methoxy-6-methyl-2-semicarbazanomethyl-4,7-dioxoindole methylcarbamate.

18. 5 - amino-1-ethyl - 3 - hydroxymethyl-2,6-dimethyl-4,7-dioxoindole propylcarbamate.

19. 5-aziridino - 1 - ethyl - 3 - hydroxymethyl - 2,6 - dimethyl-4,7-dioxoindole methylcarbamate.

20. 1-ethyl - 3 - hydroxymethyl - 5 - methoxy-2,6-dimethyl-4,7 - dioxoindole 4-(3-dimethylamino propyl)piperazine 1-carboxylate.

No references cited.

HENRY R. JILES, *Acting Primary Examiner.*

JAMES W. ADAMS, *Assistant Examiner.*